(12) United States Patent
Lu et al.

(10) Patent No.: US 11,157,163 B1
(45) Date of Patent: Oct. 26, 2021

(54) PAINTBRUSH-LIKE TECHNIQUES FOR DETERMINING FABRICABLE SEGMENTED DESIGNS

(71) Applicant: X Development LLC, Mountain View, CA (US)

(72) Inventors: Jesse Lu, Hollister, CA (US); Martin Schubert, Mountain View, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 17/036,454

(22) Filed: Sep. 29, 2020

(51) Int. Cl.
    *G06F 3/0488*    (2013.01)
    *G06F 3/041*     (2006.01)

(52) U.S. Cl.
    CPC .......... *G06F 3/0488* (2013.01); *G06F 3/0416* (2013.01)

(58) Field of Classification Search
    None
    See application file for complete search history.

(56) References Cited

U.S. PATENT DOCUMENTS

| | | | |
|---|---|---|---|
| 10,750,793 B1 * | 8/2020 | Theodoridis | A41B 9/02 |
| 10,885,262 B1 * | 1/2021 | Adolf | G06F 30/398 |
| 2013/0006720 A1 * | 1/2013 | Monoyudis | G06Q 30/0641 |
| | | | 705/12 |
| 2016/0370971 A1 * | 12/2016 | Hackett | G06F 3/017 |
| 2018/0049498 A1 * | 2/2018 | Koh | G05B 19/4097 |
| 2019/0368085 A1 * | 12/2019 | Morgan | D04B 1/24 |
| 2020/0048825 A1 * | 2/2020 | Schultz | B65D 88/12 |

OTHER PUBLICATIONS

D. Vercruysse, et al., "Analytical level set fabrication constraints for inverse design," Scientific Reports 9:8999, www.nature.com/scientificreports/ <https://doi.org/10.1038/s41598-019-45026-0>, Jun. 21, 2019, pp. 1-7.

* cited by examiner

*Primary Examiner* — Toan H Vu
(74) *Attorney, Agent, or Firm* — Christensen O'Connor Johnson Kindness PLLC

(57) ABSTRACT

Techniques for ensuring fabricability of segmented designs are provided. In some embodiments, a computing system receives a design specification to be used to create a proposed segmented design. Each segment of the proposed segmented design indicates a material within the segment. The proposed segmented design includes segments that indicate at least two different materials. The computing system chooses a segment to touch with a paintbrush pattern for a first material. The computing system updates a set of material statuses for each material based on the chosen segment. The computing system updates a set of touch statuses for each material based on the chosen segment. The choosing and updating actions are repeated until all segments are associated with a material. The computing system generates the proposed segmented design based on the sets of material statuses.

20 Claims, 23 Drawing Sheets

PAINTBRUSH-LIKE TECHNIQUES FOR DETERMINING FABRICABLE SEGMENTED DESIGNS

TECHNICAL FIELD

This disclosure relates generally to designing devices, and in particular but not exclusively, relates to determining fabricable device designs.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for converting device designs generated to maximize theoretical performance into device designs that are fabricable.

BRIEF SUMMARY

In some embodiments, a non-transitory computer-readable medium having logic stored thereon is provided. The instructions, in response to execution by one or more processors of a computing system, cause the computing system to perform actions for creating a fabricable segmented design for a physical device, the actions comprising: receiving, by the computing system, a design specification to be used to create a proposed segmented design, wherein each segment of the proposed segmented design indicates a material within the segment, and wherein the proposed segmented design includes segments that indicate at least two different materials; choosing, by the computing system, a segment to touch with a paintbrush pattern for a first material; updating, by the computing system, a set of material statuses for each material based on the chosen segment; updating, by the computing system, a set of touch statuses for each material based on the chosen segment; repeating the choosing and updating actions until all segments are associated with a material; and generating, by the computing system, the proposed segmented design based on the sets of material statuses.

In some embodiments, a computer-implemented method for ensuring fabricability of a proposed segmented design of a physical device is provided. A computing system receives a design specification to be used to create a proposed segmented design. Each segment of the proposed segmented design indicates a material within the segment. The proposed segmented design includes segments that indicate at least two different materials. The computing system chooses a segment to touch with a paintbrush pattern for a first material. The computing system updates a set of material statuses for each material based on the chosen segment. The computing system updates a set of touch statuses for each material based on the chosen segment. The choosing and updating actions are repeated until all segments are associated with a material. The computing system generates the proposed segmented design based on the sets of material statuses.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1:
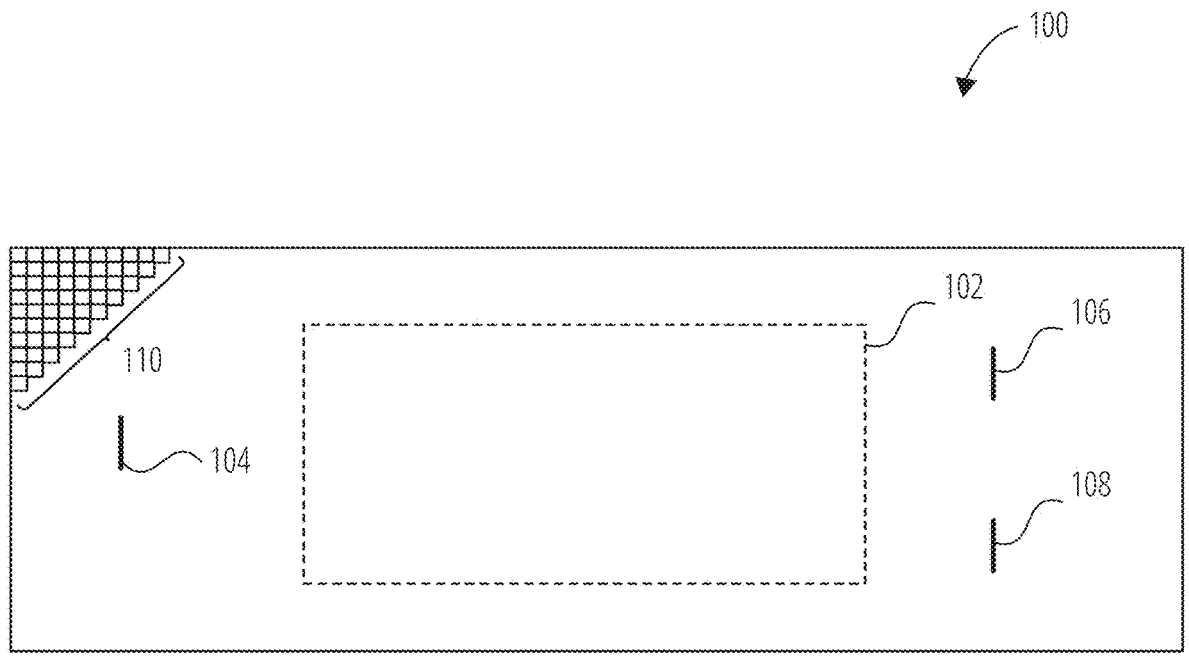
FIG. 1 illustrates an example rendering of a non-limiting example of a simulated environment 100 describing an electromagnetic device according to various aspects of the present disclosure.
Figure 2:
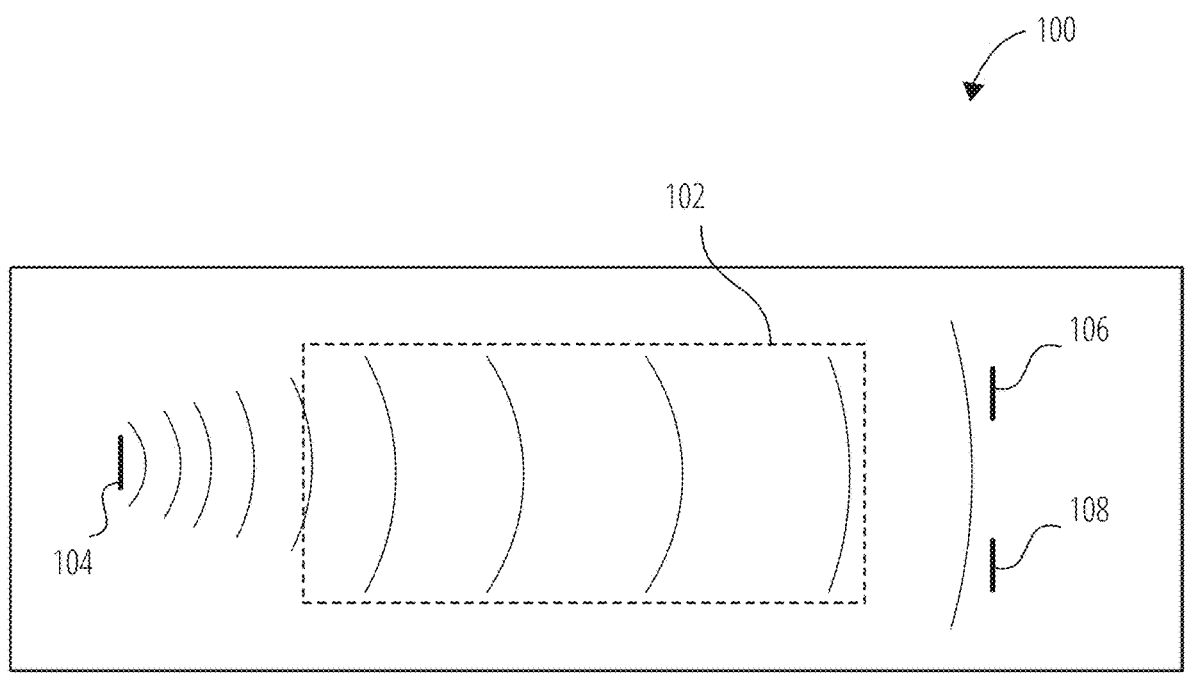
FIG. 2 illustrates a non-limiting example embodiment of a time-forward simulation of the simulated environment describing the electromagnetic device, according to various aspects of the present disclosure.

FIG. 1 and FIG. 2 illustrate an initial set up and a time-forward simulation of a simulated environment for optimizing structural parameters of an electromagnetic device according to various aspects of the present disclosure. The simulated environment 100 may be used to evaluate performance characteristics of a proposed design for the electromagnetic device.

In the following embodiments, the simulated environment 100 will be described in the context of an optical waveguide as corresponding to the electromagnetic device. However, it is appreciated that the electromagnetic device is not limited to optical waveguides, and that other electromagnetic devices such as lasers, lenses, transistors, optical devices, quantum-dynamic devices, antennas, optoelectronic switches, mechanical structures, and the like may be represented by the term "electromagnetic device." Likewise, though an electromagnetic device is an example of a type of device for which the fabricability of a proposed segmented design may be evaluated using embodiments of the present disclosure, embodiments of the present disclosure are not limited to working with designs for an electromagnetic device. Instead, embodiments of the present disclosure may be used to measure and/or validate the fabricability of a proposed segmented design for any type of device.

A segmented design, as used herein, is a design that is defined by a configuration of a plurality of segments. In some embodiments, the segmented design may be a two-dimensional design, wherein the segments are squares arranged in a two-dimensional grid pattern. In some embodiments, the segmented design may be a three-dimensional design, wherein the segments are cubes arranged in a three-dimensional grid pattern. These embodiments are non-limiting examples only, and in other embodiments, the segments may be any other shape, and/or may be laid out in any other pattern. In some embodiments, the segments of a given segmented design may be of heterogenous shapes and/or sizes.

The simulated environment 100 and corresponding initial set up and time-forward simulation may be achieved via a physics simulator. As illustrated in FIG. 1 and FIG. 2, the simulated environment 100 is represented in two-dimensions. However, it is appreciated that higher (e.g., 3-dimensional space) and lower (e.g., 1-dimensional space) dimensionality may also be used to describe the simulated environment 100 and electromagnetic device.

FIG. 1 illustrates an example rendering of a non-limiting example of a simulated environment 100 describing an electromagnetic device according to various aspects of the present disclosure. The simulated environment 100 represents the simulated environment 100 at an initial time step (e.g., an initial set up) for optimizing structural parameters of the electromagnetic device. The electromagnetic device described by the simulated environment 100 may correspond to an optical waveguide having a designable region 102 in which the structural parameters of the simulated environment may be designed, modified, or otherwise changed. The simulated environment 100 includes an excitation source 104 (e.g., a gaussian pulse, a wave, a waveguide mode response, and the like). The electrical and magnetic fields within the simulated environment 100 (and subsequently the electromagnetic device) may change (e.g., field response) in response to the excitation source 104. The electromagnetic device includes a first waveguide output port 106 and a second waveguide output port 108, which may be used for determining a performance parameter or metric of the electromagnetic device in response to the excitation source 104.

As illustrated, the simulated environment 100 (and subsequently the electromagnetic device) is described by a plurality of segments 110, which represent individual elements of the two-dimensional (or three-dimensional) space of the simulated environment. Each of the segments 110 is illustrated in FIG. 1 as two-dimensional squares, however it is appreciated that the segments 110 may be represented as cubes or other shapes in three-dimensional space, or shapes other than squares in a two-dimensional environment. It is appreciated that the specific shape and dimensionality of the plurality of segments 110 may be adjusted dependent on the simulated environment 100. It is further noted that only a portion of the plurality of segments 110 are illustrated to avoid obscuring other aspects of the simulated environment 100.

For simulation purposes, each of the plurality of segments 110 may be associated with at least a structural value to describe the structural parameters, a field value to describe a field response, and a source value to describe the excitation source at a specific position within the simulated environment 100. The field response, for example, may correspond to a vector describing the electric and/or magnetic field at a particular time step for each of the plurality of segments 110. More specifically, the vector may correspond to a Yee lattice to discretize Maxwell's equations for determining the field response. In some embodiments, the field response is based, at least in part, on the structural parameters and the excitation source 104. For design purposes, each of the plurality of segments 110 may be associated with the presence or absence of a material. The material may be deposited or removed during manufacture using a photolithography system, an additive manufacturing system, or any other suitable type of fabrication system.

FIG. 2 illustrates a non-limiting example embodiment of a time-forward simulation of the simulated environment 100 describing the electromagnetic device, according to various aspects of the present disclosure. The rendered simulated environment 100 represents the time-forward simulation at a particular time step in which the excitation source 104 is active (e.g., generating waves originating at the excitation source 104 that propagate through the simulated environment 100). In some embodiments, the electromagnetic device is an optical waveguide operating at a frequency of interest and having a particular waveguide mode (e.g., transverse electromagnetic mode, transverse electric mode, etc.) and the excitation source is at an input of the optical waveguide having a specified spatial, phase, and temporal profile. The time-forward simulation occurs over a plurality of time steps, including the illustrated time step. When performing the time-forward simulation, changes to the field response (e.g., the field value) for each of the plurality of segments 110 are updated in response to the excitation source 104 and based, at least in part, on the structural parameters of the electromagnetic device at each of the plurality of time steps. Similarly, in some embodiments the source value is updated for each of the plurality of segments 110 (e.g., in response to the electromagnetic waves from the excitation source 104 propagating through the simulated environment 100). It is appreciated that the time-forward simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the time-forward simulation, decomposition components from the field response associated with a performance parameter of the electromagnetic device are extracted. In some embodiments, the performance parameter corresponds to the amount of a desired output mode of the first waveguide output port 106 and the second waveguide output port 108. Extracting the decomposition components may correspond to extracting Fourier components of the performance parameter as a function of time. The performance parameter represents power (at one or more frequencies of interest) in the desired mode shape at the specific locations of the first waveguide output port 106 and the second waveguide output port 108. A loss value may subsequently be computed based, at least in part, on a difference between the performance parameter at a time step (e.g. a final time step of the time-forward simulation) and a desired performance value. The loss value may be determined by a loss function which describes the relationship between the performance parameter and the desired performance value. In some embodiments, backpropagation may also be performed in the simulated environment 100, and the time-forward simulation and the backpropagation may be used to improve the performance of the simulated environment 100 by suggesting changes in a design in the designable region 102.

Figure 3:
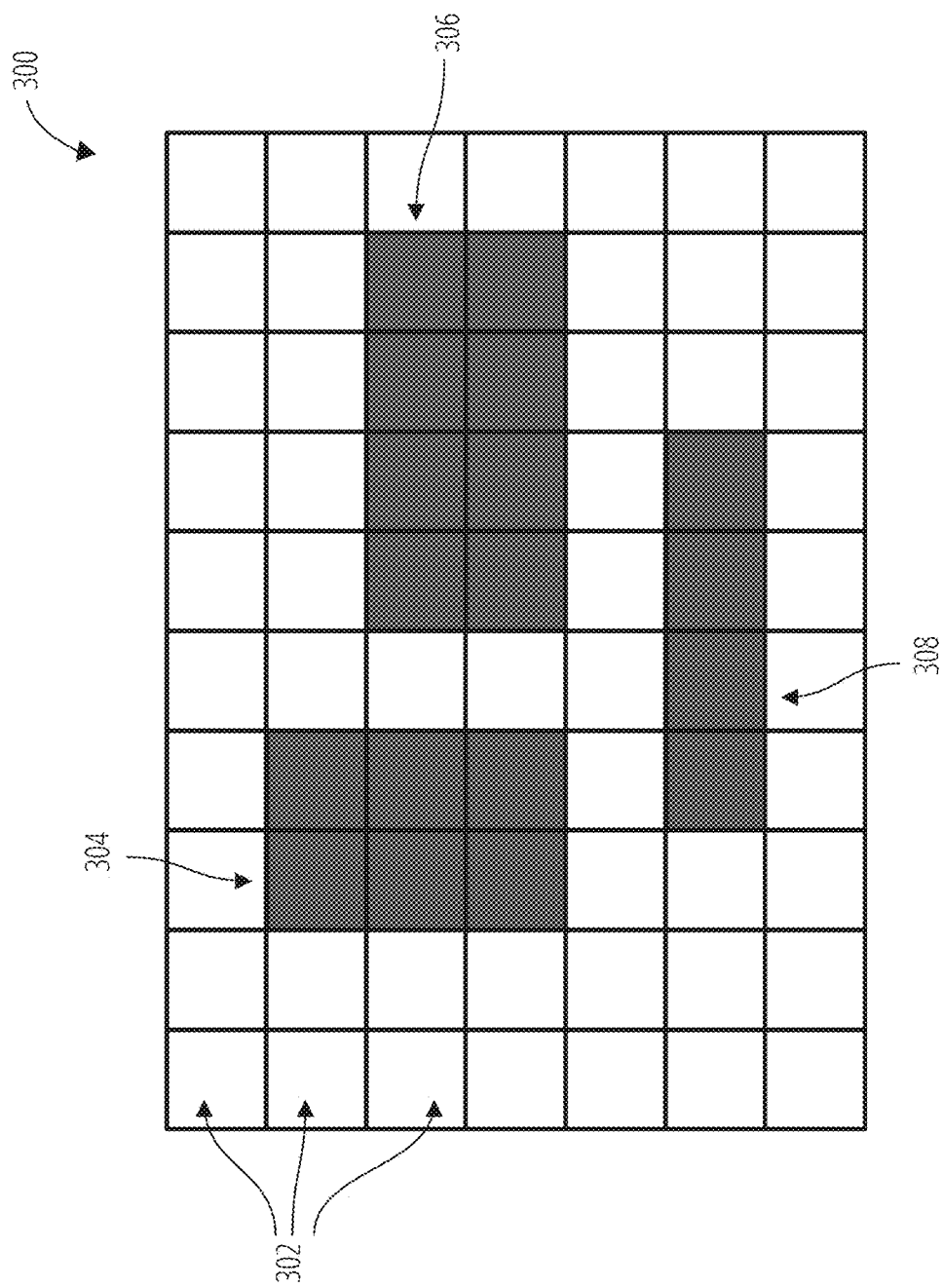
FIG. 3 is a schematic drawing that illustrates a non-limiting example embodiment of a segmented design according to various aspects of the present disclosure.

FIG. 3 is a schematic drawing that illustrates a non-limiting example embodiment of a segmented design according to various aspects of the present disclosure. The segmented design 300 is a non-limiting example of content suitable for insertion in the designable region 102 described above (though not drawn to the scale or with the same granularity of segmentation). As shown, the segmented design 300 includes a plurality of segments 302 laid out in a two-dimensional grid. Each of the segments 302 represents a location in the proposed segmented design that can either include a material or not include a material. As illustrated, segments that are white indicate a lack of the material, and segments that are dark (such as the first pattern 304, the second pattern 306, and the third pattern 308, indicate a presence of the material. For example, in a semiconductor manufacturing process that includes at least one of a photolithography process, a dry etching process, an oxide deposition process, and a planarization process, segments that are white may represent locations that are not exposed, and segments that are dark may represent locations that are exposed during the photolithography process. As another example, in a semiconductor manufacturing process, segments that are black may represent locations in the resulting device that are silicon (Si), and segments that are white may represent locations in the resulting device that are silicon dioxide ($SiO_2$). As another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 300. In some embodiments, the segmented design 300 may include more than two colors. For example, a white segment may indicate a lack of material, a segment in a first color may indicate presence of a first material, and a segment in a second color may indicate a presence of a second material. In some embodiments, the segmented design 300 may be three-dimensional or one-dimensional, instead of the two-dimensional segmented design 300 illustrated in FIG. 3.

Typically, a fabrication system can duplicate any segmented design provided to it, subject to certain constraints. For example, a minimum feature size, a minimum feature shape, or any other constraint may be specified by the fabrication system as limitations on the segmented designs that the fabrication system can fabricate. From these constraints, a "paintbrush pattern" can be determined. In some embodiments, the paintbrush pattern represents a smallest feature that can be generated by a given fabrication system. If a given segmented design can be created by tiling the paintbrush pattern over the segmented design, then the segmented design is fabricable using the associated fabrication system. If one or more portions of the segmented design cannot be drawn with the paintbrush pattern, then the segmented design is not fabricable using the associated fabrication system. In some embodiments, if a fabrication system can fabricate devices with more than one material, separate constraints (and therefore separate paintbrush pattern) may be provided for each different material.

Figure 4:
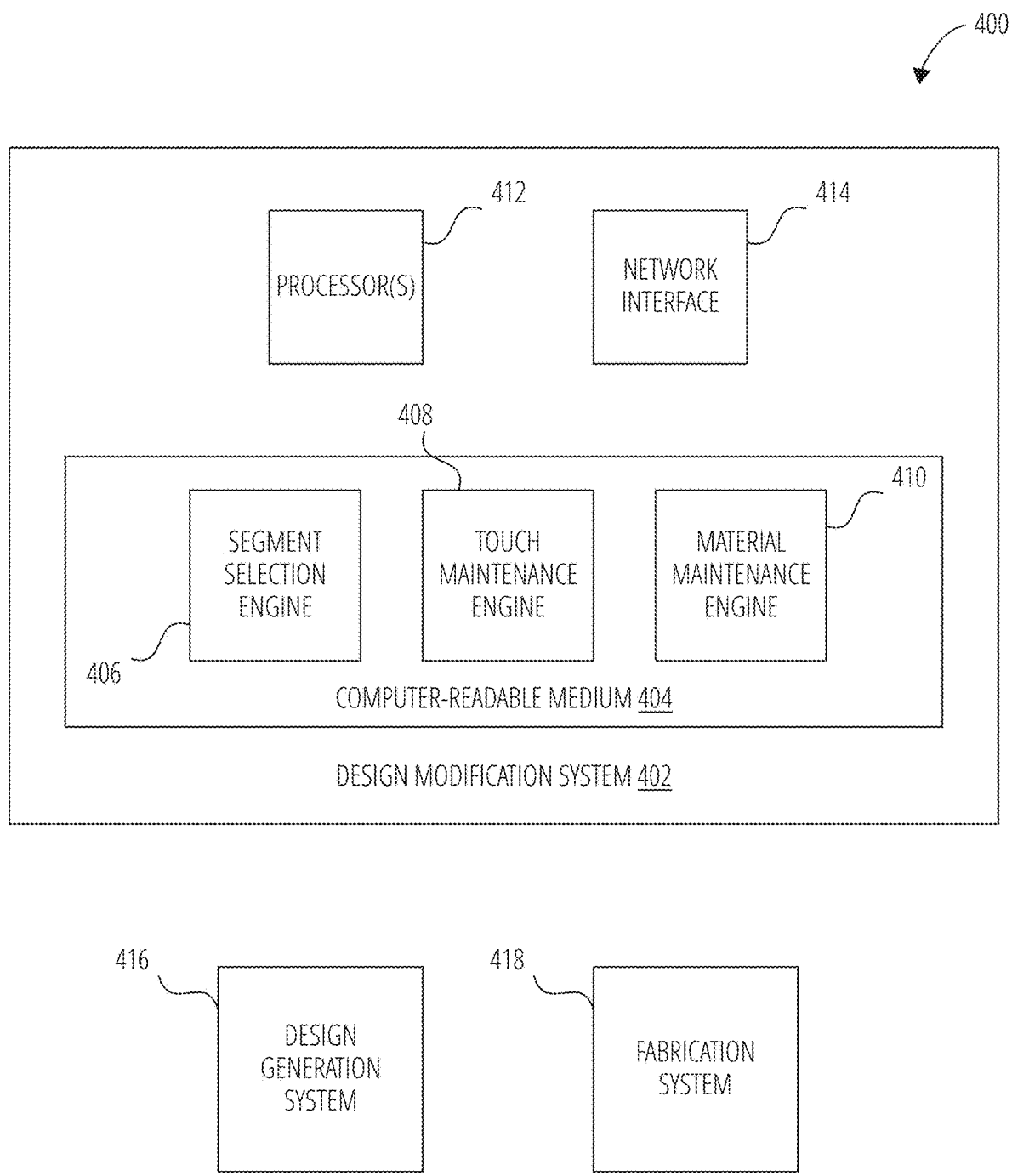
FIG. 4 is a block diagram that illustrates a non-limiting example embodiment of a system according to various aspects of the present disclosure.

FIG. 4 is a block diagram that illustrates a non-limiting example embodiment of a system according to various aspects of the present disclosure. Overall, the illustrated embodiment of the system 400 is configured to generate segmented designs, to establish fabricability of the segmented designs, and to fabricate physical devices based on proposed segmented designs.

As shown, the system 400 includes a design generation system 416, a fabrication system 418, and a design modification system 402. Communication between the design generation system 416, the design modification system 402, and the fabrication system 418 may occur via a network (not pictured), via exchange of a removable computer-readable medium (not pictured), or via any other suitable technique. Though the design generation system 416, fabrication system 418, and design modification system 402 are illustrated as separate systems, in some embodiments, some portions of these systems may be combined. As one non-limiting example, the design generation system 416 and the design modification system 402 may be combined in a single system. Also, in some embodiments, systems illustrated in FIG. 4 as a single system may be broken into multiple systems.

In some embodiments, the design generation system 416 may include one or more computing devices that are configured to generate segmented designs that achieve a desired result. For example, the design generation system 416 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 416 to create segmented designs.

In some embodiments, the fabrication system 418 may be any suitable system for fabricating a segmented design. In some embodiments, the fabrication system 418 may be a photolithography system or an additive manufacturing system. In some embodiments, the fabrication system 418 may have characteristics that include a minimum feature size, a minimum feature shape, and/or other constraints that help define the segmented designs that the fabrication system 418 is capable of fabricating. To that end, the fabrication system 418 may provide a design rule checker that is configured to process segmented designs in an inefficient legacy manner to determine whether the segmented designs comply with the constraints of the fabrication system 418. In some embodiments, the fabrication system 418 may specify one or more paintbrush patterns that represent the fabrication capabilities of the fabrication system 418.

In some embodiments, the design modification system 402 may be any suitable computing device or collection of computing devices configured to provide the described functionality. In some embodiments, the design modification system 402 may be a server computing device, a desktop computing device, a laptop computing device, a mobile computing device, a tablet computing device, or one or more computing devices of a cloud computing system.

As shown, the design modification system 402 includes one or more processor(s) 412, a network interface 414, and a computer-readable medium 404. In some embodiments, the processor(s) 412 may include a plurality of processors and/or a plurality of processing cores in order to provide a large amount of computing power. In some embodiments, the network interface 414 may be configured to communicate with the design generation system 416 and/or the fabrication system 418 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 414, the design modification system 402 may be configured to communicate with the design generation system 416 and/or the fabrication system 418 via transfer of a removable computer-readable medium (not shown).

As shown, the computer-readable medium 404 has stored thereon logic that, in response to execution by the processor(s) 412, cause the design modification system 402 to provide a segment selection engine 406, a touch maintenance engine 408, and a material maintenance engine 410.

In some embodiments, the segment selection engine 406 is configured to choose a segment of a segmented design to have a given material present. As will be discussed below, multiple different strategies may be used by the segment selection engine 406 in order to select segments and materials in order to efficiently create a manufacturable version of a proposed segmented design.

In some embodiments, the touch maintenance engine 408 is configured to maintain a set of touch statuses for the segments of the segmented design, wherein the touch statuses represent locations where a paintbrush pattern for a given material has "touched" the segmented design (or various other statuses representing other possible future statuses of the segments). In some embodiments, the material maintenance engine is configured to maintain a set of material statuses for the segments of the segmented design, wherein the material statuses represent whether a given material is present in the given segment (or various other statuses representing other possible future statuses of the segments). Further description of the functionality of each of these components is provided below.

As used herein, "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 5:
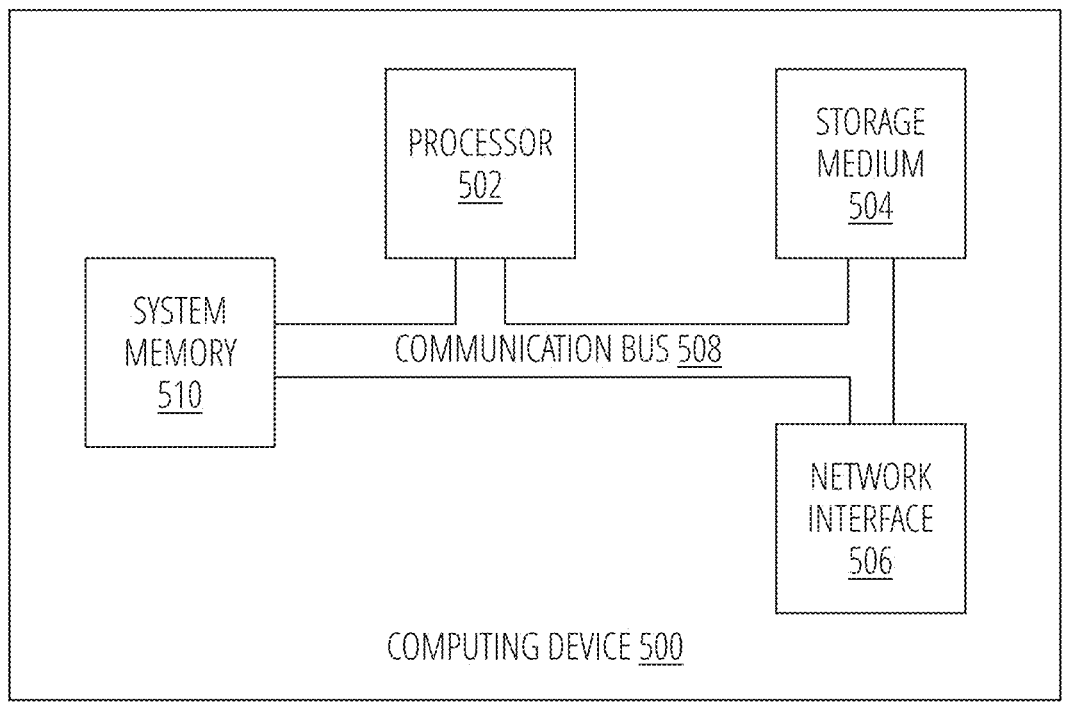
FIG. 5 is a block diagram that illustrates a non-limiting example embodiment of a computing device appropriate for use as a computing device with embodiments of the present disclosure.

FIG. 5 is a block diagram that illustrates aspects of an exemplary computing device 500 appropriate for use as a computing device of the present disclosure. While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 500 may be any one of any number of currently available or yet to be developed devices.

In its most basic configuration, the computing device 500 includes at least one processor 502 and a system memory 510 connected by a communication bus 508. Depending on the exact configuration and type of device, the system memory 510 may be volatile or nonvolatile memory, such as read only memory ("ROM"), random access memory ("RAM"), EEPROM, flash memory, or similar memory technology. Those of ordinary skill in the art and others will recognize that system memory 510 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 506 comprising one or more components for communicating with other devices over a network. Embodiments of the present disclosure may access basic services that utilize the network interface 506 to perform communications using common network protocols. The network interface 506 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 506 illustrated in FIG. 5 may represent one or more wireless interfaces or physical communication interfaces described and illustrated above with respect to particular components of the computing device 500.

In the exemplary embodiment depicted in FIG. 5, the computing device 500 also includes a storage medium 504. However, services may be accessed using a computing device that does not include means for persisting data to a local storage medium. Therefore, the storage medium 504 depicted in FIG. 5 is represented with a dashed line to indicate that the storage medium 504 is optional. In any event, the storage medium 504 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 502, system memory 510, communication bus 508, storage medium 504, and network interface 506 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, Bluetooth low energy, USB, or other suitable connections protocols using wireless or physical connections. Similarly, the computing device 500 may also include output devices such as a display, speakers, printer, etc. Since these devices are well known in the art, they are not illustrated or described further herein.

Figure 6:
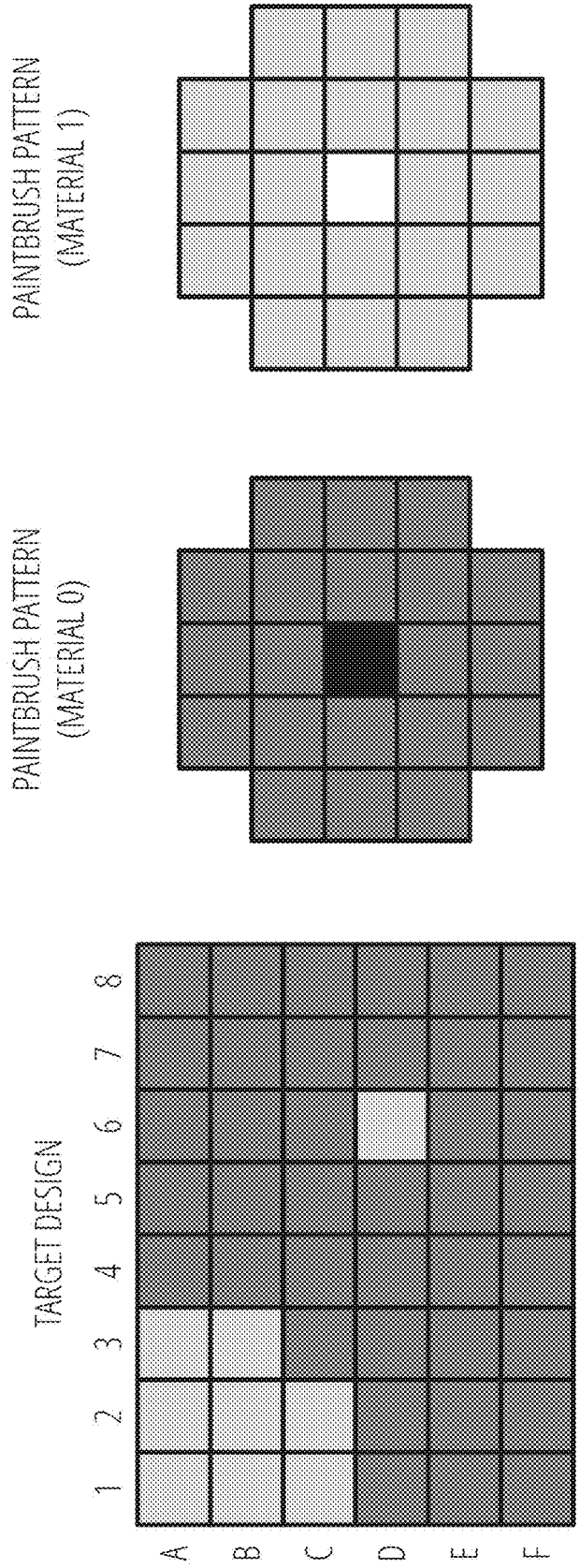
FIG. 6 is an illustration of a non-limiting example embodiment of a proposed segmented design and paintbrush patterns associated with a fabrication system according to various aspects of the present disclosure.

FIG. 6 is an illustration of a non-limiting example embodiment of a segmented design and paintbrush patterns associated with a fabrication system according to various aspects of the present disclosure.

As shown, the segmented design (labeled "target design") is eight segments wide (labeled 1 through 8) and six segments tall (labeled A through F). The segmented design is made up of two materials, a first material ("material 0") and a second material ("material 1"). The segments in the segmented design that are made up of the first material are shaded with a darker shade, and the segments in the segmented design that are made up of the second material are shaded with a lighter shade. As discussed above, in some embodiments a segmented design may include more than two materials, though two materials are illustrated here for ease of discussion. The top-left portion of the segmented design is made up of the second material, while the bottom-right portion of the segmented design is made up of the first material (other than a single segment at D6 that is made up of the second material).

While this segmented design may be generated by the design generation system 416 to be highly performant, it is not yet clear whether the fabrication system 418 is capable of generating all of the features of the segmented design. To represent the capabilities of the fabrication system 418, a paintbrush pattern for the first material and a paintbrush pattern for the second material have been determined and are illustrated. Each paintbrush pattern is a collection of segments that represents the size and shape of the smallest feature that can be created out of the material by the fabrication system 418. Though FIG. 6 illustrates paintbrush patterns for the first material and the second material that are the same size and shape, in some embodiments, paintbrush patterns of different shapes and/or sizes may be used for each material, depending on the capabilities of the fabrication system 418.

For purposes of indicating where a paintbrush pattern is applied to a tiling of the segmented design, a single segment of each paintbrush pattern is designated as a touch point. As shown, the central segment of each of the paintbrush patterns (the black segment in the center of the paintbrush pattern for the first material and the white segment in the center of the paintbrush pattern for the second material) is indicated as the touch point, though in some embodiments, any segment of the paintbrush pattern may be chosen so long as the same segment for a given paintbrush pattern is used consistently.

By determining whether the paintbrush patterns can be tiled on the segmented design, it can be determined whether the segmented design is manufacturable by the fabrication system 418. However, it may be desired not just to determine whether or not the segmented design is manufacturable, but also to modify the segmented design to be manufacturable if it is not manufacturable as provided by the design generation system 416.

Figure 7A:
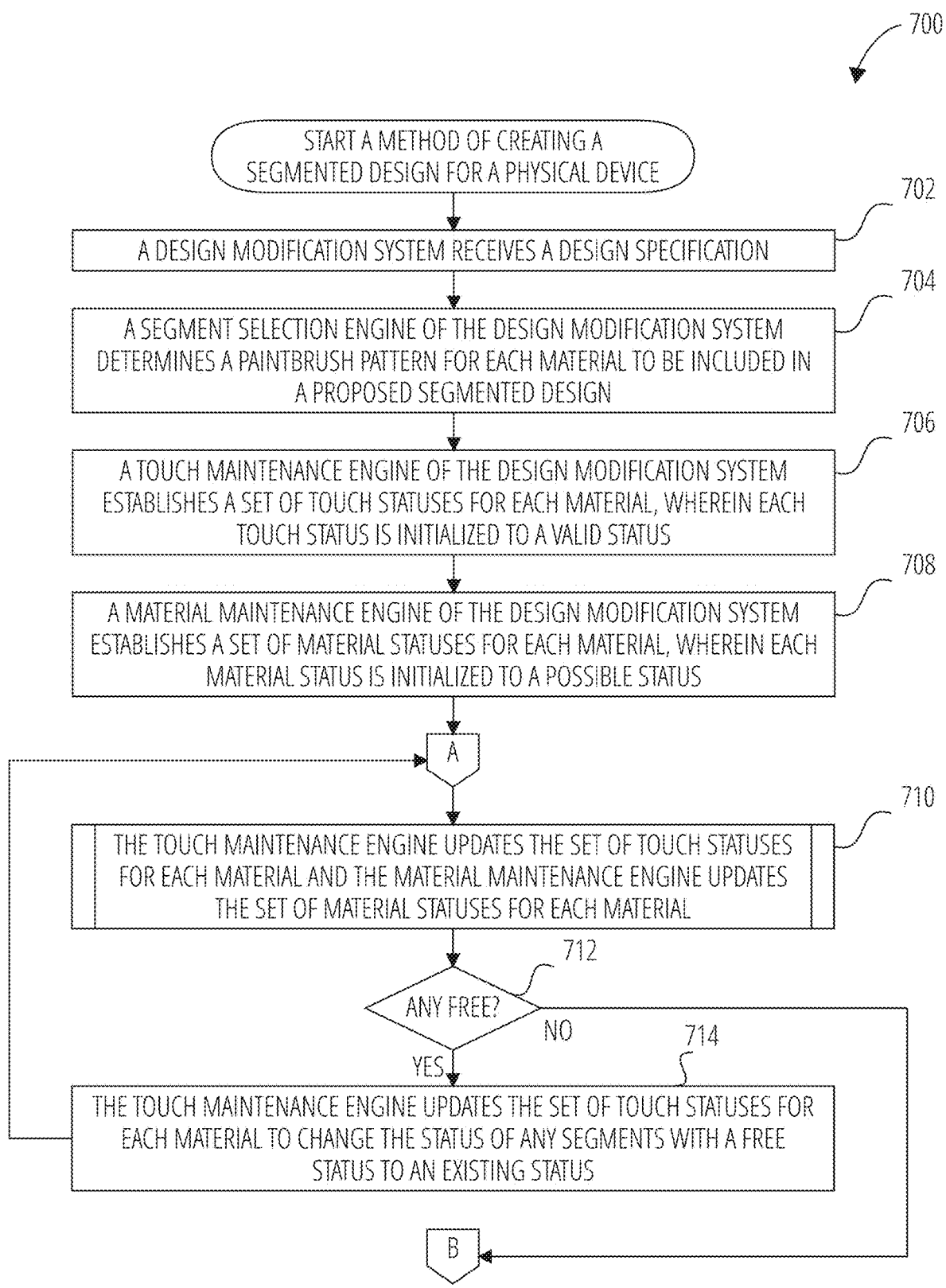
FIG. 7A-FIG. 7B are a flowchart that illustrates a method of creating a segmented design for a physical device according to various aspects of the present disclosure.
Figure 7B:
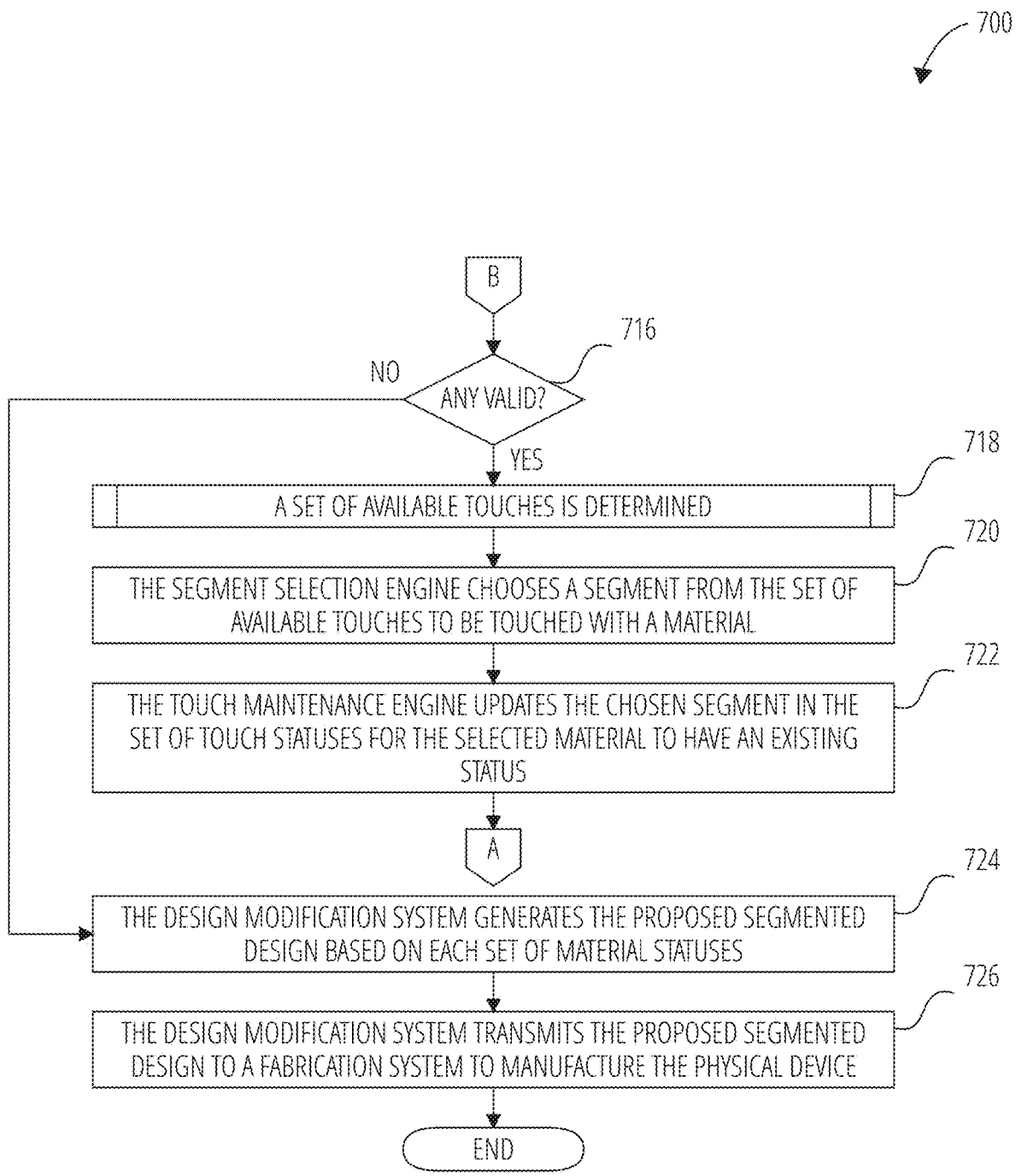

FIG. 7A-FIG. 7B are a flowchart that illustrates a method of creating a segmented design for a physical device according to various aspects of the present disclosure. In general, the method 700 may be used to generate a segmented design that minimizes any suitable cost function and is guaranteed to be fabricable by the fabrication system 418.

In some embodiments, the method 700 may be used to generate a fabricable segmented design that replicates an input segmented design as closely as possible in order to determine a fabricable version of the input segmented design. These embodiments may be useful to validate the output of an inverse design process that determines the segmented design with regard to performance but without regard to fabricability. In such embodiments, the cost function may reflect how many differences would be introduced between the input segmented design and the proposed segmented design by each given touch.

In some embodiments, the method 700 may use an input other than a segmented design and may therefore use a different cost function. For example, in some embodiments, the method 700 may receive as input a linear function that is meant to be minimized by a segmented design, without receiving any segmented design itself. In such embodiments, the cost function may reflect an effect of each touch on the linear function.

One will note that the method 700 describes selecting a single segment of the proposed segmented design to be touched at a time. This description is for ease of discussion only. In some embodiments, the method 700 may operate in parallel on multiple selected segments in order to more quickly process the entire proposed segmented design. For example, the method 700 may choose multiple segments that are separated by a minimum distance that guarantees that no segments in common would be affected by touches in both chosen segments.

From a start block, the method 700 proceeds to block 702, where a design modification system 402 receives a design specification.

As discussed above, in some embodiments, the design specification may be a segmented design generated by the design generation system 416, wherein each segment of the segmented design indicates a material within the segment. As discussed above, in some embodiments, the segments of the segmented design may indicate two or more materials, or may indicate a presence or absence of a single material. In other embodiments, the design specification may be a linear function that describes a desired characteristic of the physical device. While much of the discussion below relates to embodiments wherein a segmented design is provided as the design specification, it should be noted that embodiments of the present disclosure may be used for any type of design specification (including but not limited to segmented designs and linear functions).

At block 704, a segment selection engine 406 of the design modification system 402 determines a paintbrush pattern for each material to be included in a proposed segmented design. In some embodiments, the paintbrush patterns may be based on a minimum feature size and minimum feature shape specified by the fabrication system 418. In some embodiments, the paintbrush patterns may be derived by analyzing output of a design rule checker that accompanies the fabrication system 418. In some embodiments, the paintbrush patterns may be provided manually. In some embodiments, determining the paintbrush patterns also includes specifying a touch point for each paintbrush pattern to be used later in the method 700.

In order to build a tiling for the proposed segmented design, the method 700 keeps track of possible locations that the paintbrush patterns could be applied, as well as keeping track of the state of each resulting segment. Accordingly, in some embodiments, the method 700 tracks a set of touch statuses and a set of material statuses for each material. In some embodiments, a "touch" is a location within a segmented design where a touch point of a paintbrush pattern is chosen to occur. A touch at a segment using a paintbrush pattern causes segments covered by the paintbrush pattern to be filled with the material associated with the paintbrush pattern, with reference to the touch point of the paintbrush pattern being aligned with the touched segment.

In some embodiments, the states which may be specified for a touch status are as follows. The letters in parentheses indicate the associated letters in the sets of touch statuses and the sets of material statuses in the figures:

Valid status (V): a segment that may be touched by the paintbrush pattern of the associated material (a segment that, if touched by the paintbrush pattern of the associated material, does not affect any segments having an existing status for a different material)

Invalid status (I): a segment that may not be touched by the paintbrush pattern of the associated material Existing status (E): a segment that has already been touched by the paintbrush pattern of the associated material Free status (F): a segment which, if touched by the paintbrush pattern of the associated material, does not affect any segments having an existing status or a possible status for a different material, and would only affect segments that have an existing status or a required status for the associated material Required-resolving status (R): a segment that, if touched by the paintbrush pattern of the associated material, would affect at least one segment having a required status (described below)

In some embodiments, the states which may be specified for a material status are as follows:

Possible status (P): a segment that may be filled with the associated material

Existing status (E): a segment that is already filled with the associated material Impossible status (I): a segment that may not be filled with the associated material Required status (R): a segment that may be filled with the associated material and may not be filled by any other material Further description of how a segment may be assigned to each of these states is provided below.

To initialize the sets of touch statuses and the sets of material statuses, at block 706, a touch maintenance engine 408 of the design modification system 402 establishes a set of touch statuses for each material, wherein each touch status is initialized to a valid status, and at block 708, a material maintenance engine 410 of the design modification system 402 establishes a set of material statuses for each material, wherein each material status is initialized to a possible status.

Figure 10A:
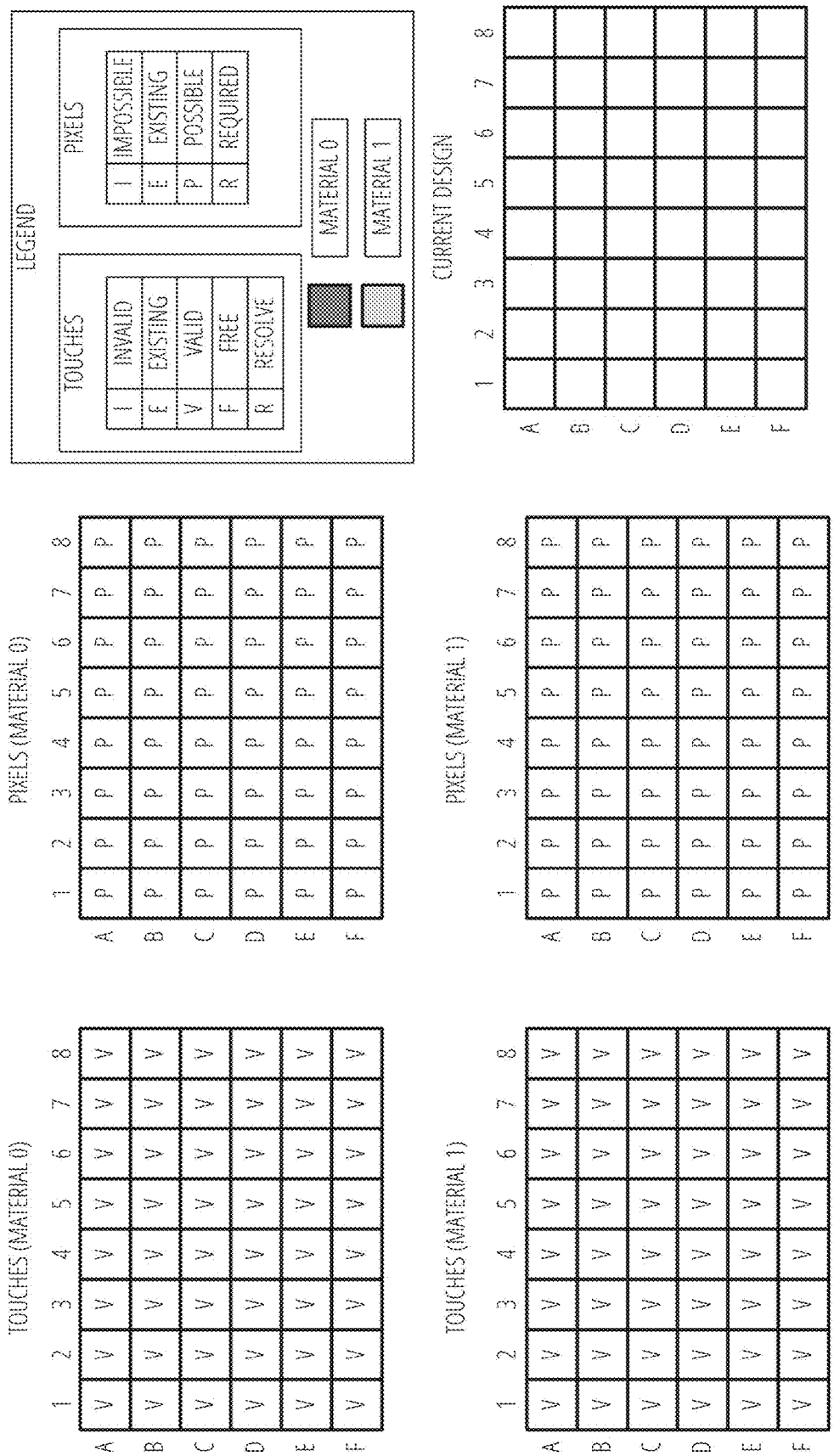
FIG. 10A-FIG. 10L illustrate examples of how sets of touch statuses and sets of material statuses may be updated by the method illustrated in FIG. 7A-FIG. 7B while determining a tiling based on the segmented design illustrated in FIG. 6.

FIG. 10A-FIG. 10L illustrate examples of how sets of touch statuses and sets of material statuses may be updated by the method 700 while determining a tiling based on the segmented design illustrated in FIG. 6. As shown in FIG. 10A, a set of touch statuses for material 0 (the first material) is shown in the upper left, a set of touch statuses for material 1 (the second material) is shown in the bottom left, a set of material statuses for material 0 is shown in the top center, a set of material statuses for material 1 is shown in the bottom center. The sets of touch statuses are filled with segments having a valid status, and the sets of material statuses are filled with segments having a possible status.

A legend is shown in the top right, and a depiction of the current state of the proposed segmented design is shown in the bottom right. The sets of touch statuses and the sets of material statuses have the same dimensions as the proposed segmented design, and the proposed segmented design will include the result of the processing of the method 700. If the design specification was a fabricable segmented design, then the proposed segmented design may match the design specification. If the design specification was a segmented design that was not fabricable, then the proposed segmented design may be different from the design specification, but will be fabricable. FIG. 10A illustrates a post-initialization state, and the remainder of FIG. 10B-FIG. 10L will illustrate how the state changes during processing.

Figure 8A:
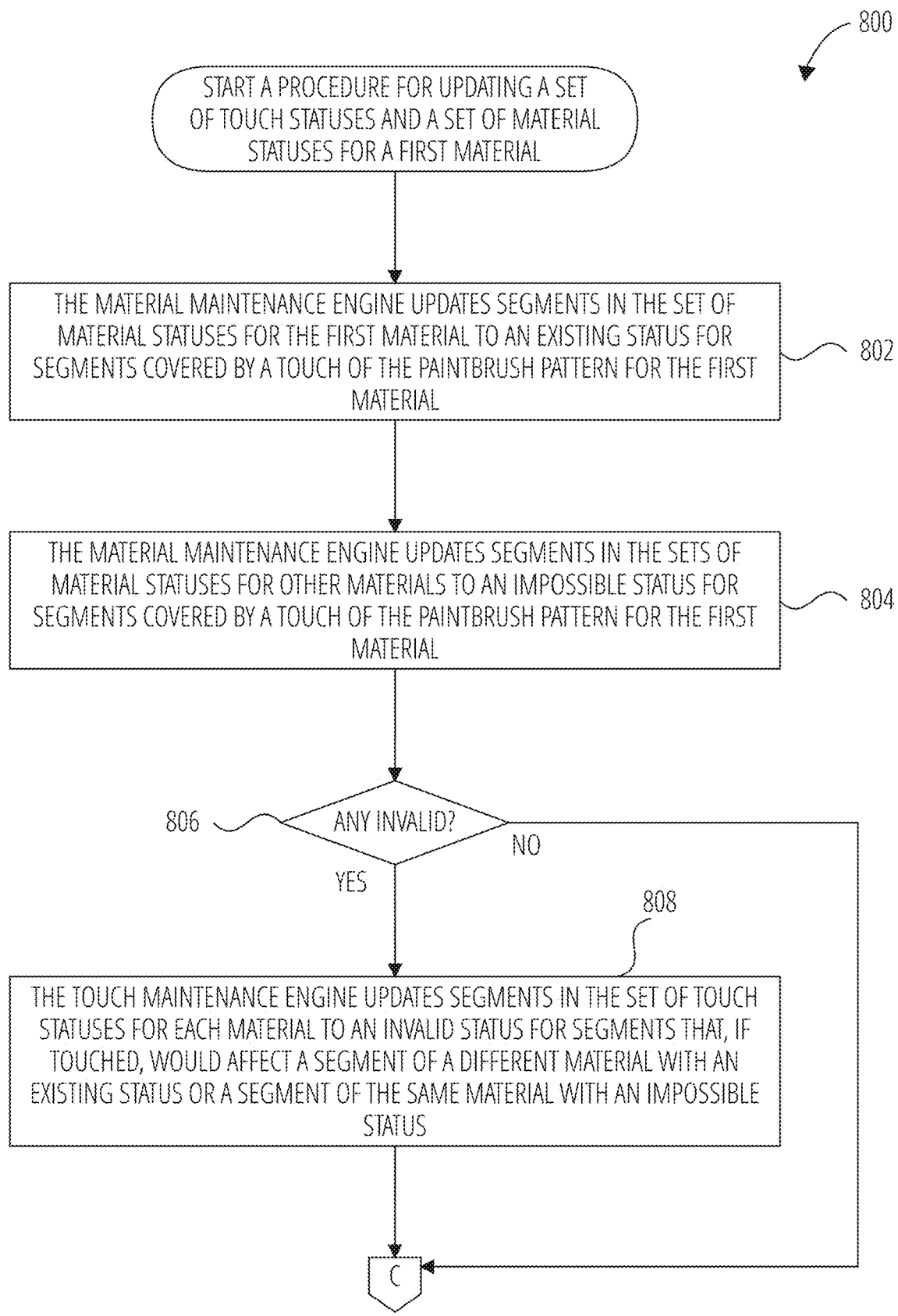
FIG. 8A-FIG. 8B are a flowchart that illustrates a non-limiting example embodiment of a procedure for updating a set of touch statuses and a set of material statuses for a first material according to various aspects of the present disclosure.
Figure 8B:
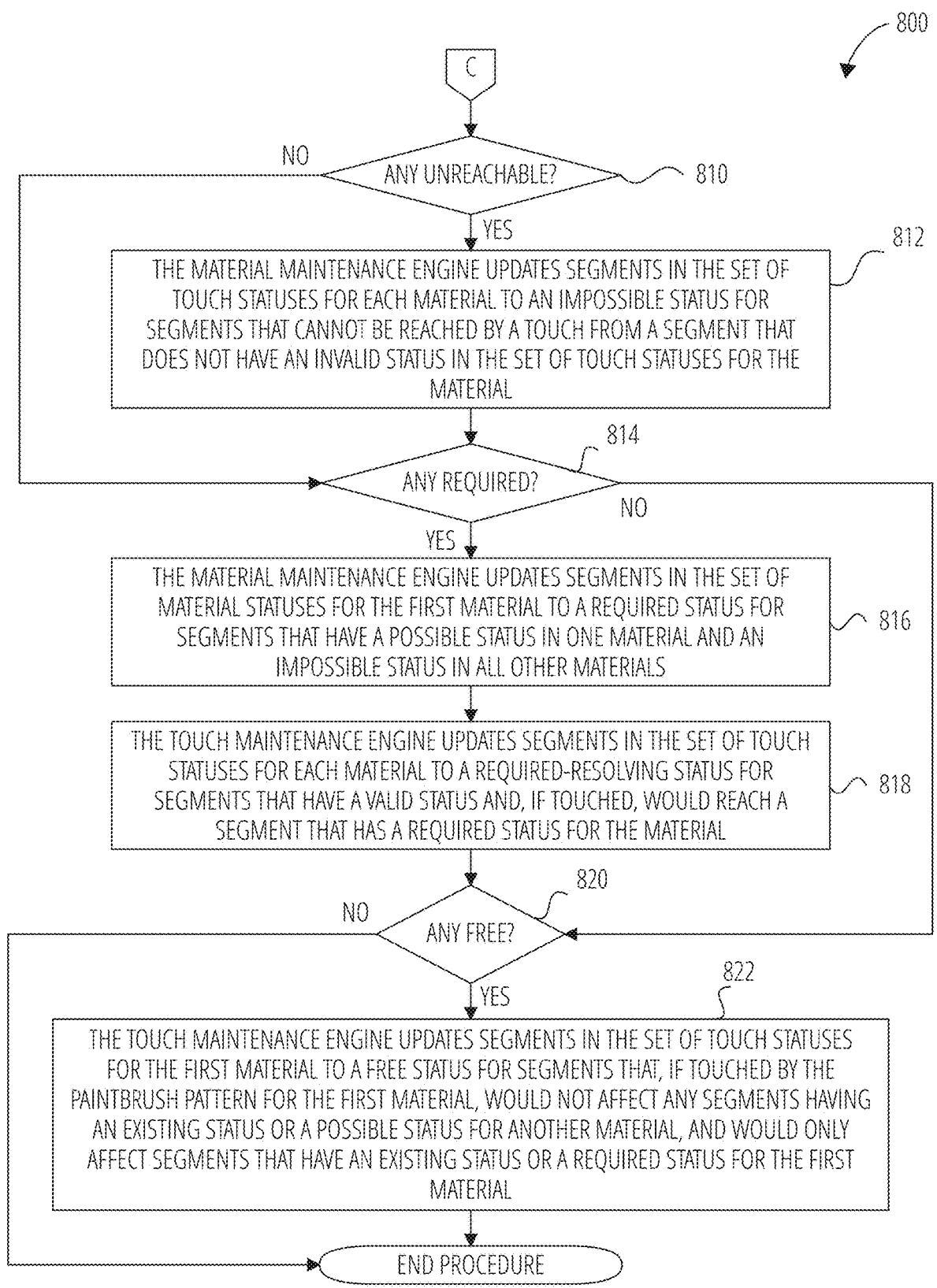

After block 708, the method 700 proceeds through a continuation terminal ("terminal A") to procedure block 710, where a procedure is called wherein the touch maintenance engine 408 updates the set of touch statuses for each material and the material maintenance engine 410 updates the set of material statuses for each material. The updates will cause the sets of touch statuses and the sets of material statuses to reflect effects caused by a previously selected touch. On a first loop through the method 700, the first call to procedure block 710 may not cause any changes, because no segments have yet been touched. On subsequent loops through the method 700, the sets of touch statuses and the sets of material statuses will be updated according to the previously touched segment (or segments). In some embodiments, the procedure called in procedure block 710 may process a single material at a time, in which case the call to the procedure may be repeated for each material. In some embodiments, the procedure called in procedure block 710 may be called a single time to process all materials. A non-limiting example embodiment of a procedure suitable for use at procedure block 710 is illustrated in FIG. 8A-FIG. 8B and described in detail below.

After returning from the procedure at procedure block 710, the method 700 proceeds to decision block 712, where a determination is made regarding whether there are any segments that have a free status. If any segments with a free status are present, then the result of decision block 712 is YES, and the method 700 proceeds to block 714, where the touch maintenance engine 408 updates the set of touch statuses for each material to change the status of any segments with a free status to an existing status. The method 700 then returns to terminal A to update the sets of touch statuses and the sets of material statuses again. Otherwise, if no segments with a free status are present, then the result of decision block 712 is NO, and the method 700 proceeds to a continuation terminal ("terminal B").

Figure 9:
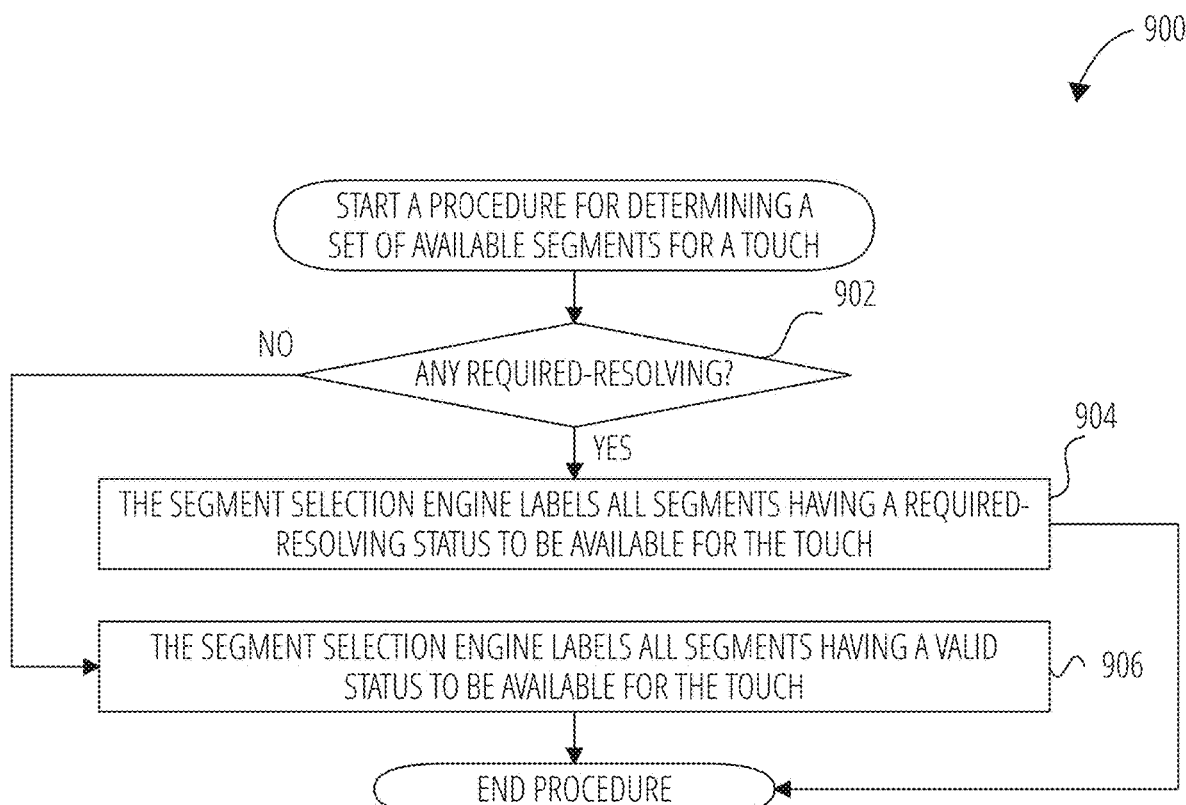
FIG. 9 is a flowchart that illustrates a non-limiting example embodiment of a procedure for determining a set of available segments for a touch according to various aspects of the present disclosure.

From terminal B (FIG. 7B), the method 700 proceeds to decision block 716, where a determination is made regarding whether any segments remain that have the valid status. If segments remain that have the valid status, then the result of decision block 716 is YES, and the method 700 advances to procedure block 718, where a procedure is executed wherein a set of available touches is determined. A non-limiting example embodiment of a procedure suitable for use at procedure block 718 is illustrated in FIG. 9 and described in detail below.

After the set of available touches is determined at procedure block 718, the method 700 advances to block 720, where the segment selection engine 406 chooses a segment from the set of available touches to be touched with a material. Any suitable technique may be used to select the segment to be touched and the material to be used. In some embodiments, the segment selection engine 406 may determine a cost for selecting each segment and may choose a segment based on the cost. For example, if the method 700 is attempting to reproduce a segmented design provided by the design generation system 416, a cost may be determined based on whether a touch at the segment would cause any segments in the proposed segmented design to be filled with an unwanted material based on the provided segmented design. The cost may be higher may be based on how many segments from the proposed segmented design may be filled with the unwanted material. As another example, if the method 700 is attempting to generate as proposed segmented design that minimizes a linear function, the segment selection engine 406 may determine the value of the linear function for each touch in the set of available touches, and may choose the touch based on the determined values (such as the touch with the minimum value, or randomly from a set of, for example, the ten lowest valued touches).

In some embodiments, the segment selection engine 406 may determine a cost for all segments in all of the sets of touch statuses and may choose a globally optimal segment based on all of the costs. In some embodiments, the segment selection engine 406 may cycle through materials, and may consider segments for a first material in a first loop of method 700, may consider segments for a second material in a second loop of method 700, and so on. In some embodiments, the segment selection engine 406 may use a random selection to select a segment to touch, either globally or from a set of segments determined based on the costs.

As an illustration of a non-limiting example of how a cost may be determined, in FIG. 6, a touch using the paintbrush for material 0 at A7 would have a minimal cost, because only segments that are specified by the proposed segmented design as being material 0 would be filled by material 0. In comparison, a touch with the material 0 paintbrush at D7 would have a higher cost, because the segment at D6 is specified by the proposed segmented design as being material 1. As more of the design is filled in, minimal cost touches may no longer be available (e.g., only touches that would fill segment D6 with material 0 may be possible), and so the segment selection engine 406 may select a lowest-cost touch in order to change the proposed segmented design as little as possible while still maintaining fabricability of the output design.

After the segment is chosen, the touch is implemented when, at block 722, the touch maintenance engine 408 updates the chosen segment in the set of touch statuses for the selected material to have an existing status. The method 700 then returns to terminal A to update the sets of touch statuses and the sets of material statuses based on the touch.

Returning to decision block 716, if it is determined that no segments having the valid status remain, then the result of decision block 716 is NO, and the method 700 advances to block 724. At block 724, the design modification system 402 generates the proposed segmented design based on each set of material statuses.

By looping through the method 700, by block 724 it is guaranteed that each segment of the proposed segmented design will have exactly one material assigned to it, and that the proposed segmented design will be fabricable by the fabrication system 418. In embodiments wherein a segmented design to be copied is provided to the method 700, the patterns described by the sets of material statuses may be different from the provided segmented design because the painting of the materials was selected by choosing minimal cost touch locations (but not touch locations guaranteed to be zero cost). For example, in FIG. 10L, the design illustrated as the current design (which is the output of executing the method 700 over the provided segmented design of FIG. 6 using the paintbrush patterns illustrated in FIG. 6) does not exactly match the provided segmented design, but does provide a fabricable design that is similar to the provided segmented design.

At block 726, the design modification system 402 transmits the proposed segmented design to the fabrication system 418 to manufacture the physical device. In some embodiments, the proposed segmented design may instead be stored for later fabrication. In some embodiments, the proposed segmented design may be provided back to the design generation system 416 for performance simulation, and the design generation system 416 may generate a new proposed segmented design based on the result of the simulation.

The method 700 then proceeds to an end block and terminates.

FIG. 8A-FIG. 8B are a flowchart that illustrates a non-limiting example embodiment of a procedure for updating a set of touch statuses and a set of material statuses for a first material according to various aspects of the present disclosure. As stated above, in some embodiments, a calling method (such as method 700) may call the procedure 800 once for each material to be included in a proposed segmented design. In some embodiments (for example, if only a single material has been newly touched), a single execution of the procedure 800 will be adequate to process all materials at the same time, with the first material being the material of a segment that was most recently touched. In some embodiments, only a single touched segment may be processed by procedure 800, while in other embodiments, multiple touched segments may be processed by procedure 800 concurrently.

From a start block, the procedure 800 proceeds to block 802, where the material maintenance engine 410 updates segments in the set of material statuses for the first material to an existing status for segments covered by a touch of the paintbrush pattern for the first material, and at block 804, the material maintenance engine 410 updates segments in the sets of material statuses for other materials to an impossible status for segments covered by a touch of the paintbrush pattern for the first material.

At decision block 806, a determination is made regarding whether there are any segments that should have an invalid status. Segments should have an invalid status in the set of touch statuses for a material if a touch in the segment would reach a segment of a different material with an existing status in its set of material statuses or a segment of the same material with an impossible status in its set of material statuses. Accordingly, if it is determined that any segments that should have an invalid status are present, then the result of decision block 806 is YES, and the procedure 800 proceeds to block 808, where the touch maintenance engine 408 updates segments in the set of touch statuses for each material to an invalid status for segments that, if touched, would reach a segment of a different material with an existing status or a segment of the same material with an impossible status. Otherwise, if it is determined that no segments that should have an invalid status are present, then the result of decision block 806 is NO, and the procedure 800 proceeds to a continuation terminal ("terminal C").

From terminal C (FIG. 8B), at decision block 810, a determination is made regarding whether there are any unreachable segments for each material. An unreachable segment is a segment having a possible status in the set of material statuses for a given material but that cannot be reached from a touch in a segment that does not have an invalid status in the set of touch statuses for the given material. If any unreachable segments are determined to be present, then the result of decision block 810 is YES, and the procedure 800 proceeds to block 812, where the material maintenance engine 410 updates segments in the set of touch statuses for each material to an impossible status for segments that cannot be reached by a touch from a segment that doesn't have an invalid status in the set of touch statuses for the material. Otherwise, if no unreachable segments are determined to be present, then the result of decision block 810 is NO, and the procedure 800 proceeds decision block 814.

At decision block 814, a determination is made regarding whether there are any segments that should have a required status. Segments should have a required status in the set of material statuses for a given material if the segment has a possible status in the given material and an impossible status in all other materials. Accordingly, if it is determined that any segments that should have a required status are present, then the result of decision block 814 is YES, and the procedure 800 proceeds to block 816.

At block 816, the material maintenance engine 410 updates segments in the sets of material statuses to a required status for segments that have a possible status in one material and an impossible status in all other materials. At block 818, the touch maintenance engine 408 updates segments in the set of touch statuses for each material to a required-resolving status for segments that have a valid status and, if touched, would reach a segment that has a required status in the material.

Returning to decision block 814, if it is determined that no segments that should have a required status are present, then the result of decision block 814 is NO, and the procedure 800 proceeds to decision block 820.

At decision block 820, a determination is made regarding whether there are any segments that should have a free status. Segments should have a free status in the set of touch statuses for a material if touching the segment would not affect any segments having an existing status or a possible status for another material, and would only affect segments that have an existing status or a required status for the first material. Accordingly, if it is determined that any segments that should have a free status are present, then the result of decision block 820 is YES, and the procedure 800 proceeds to block 822, where the touch maintenance engine 408 updates segments in the set of touch statuses for the first material to a free status for segments that, if touched by the paintbrush pattern for the first material, would not affect any segments having an existing status or a possible status for another material, and would only affect segments that have an existing status or a required status for the first material. After block 822, the procedure 800 proceeds to an end block and returns control to its caller.

Returning to decision block 820, if it is determined that no segments that should have a free status are present, then the result of decision block 820 is NO, and the procedure 800 proceeds to an end block and returns control to its caller.

Figure 10B:
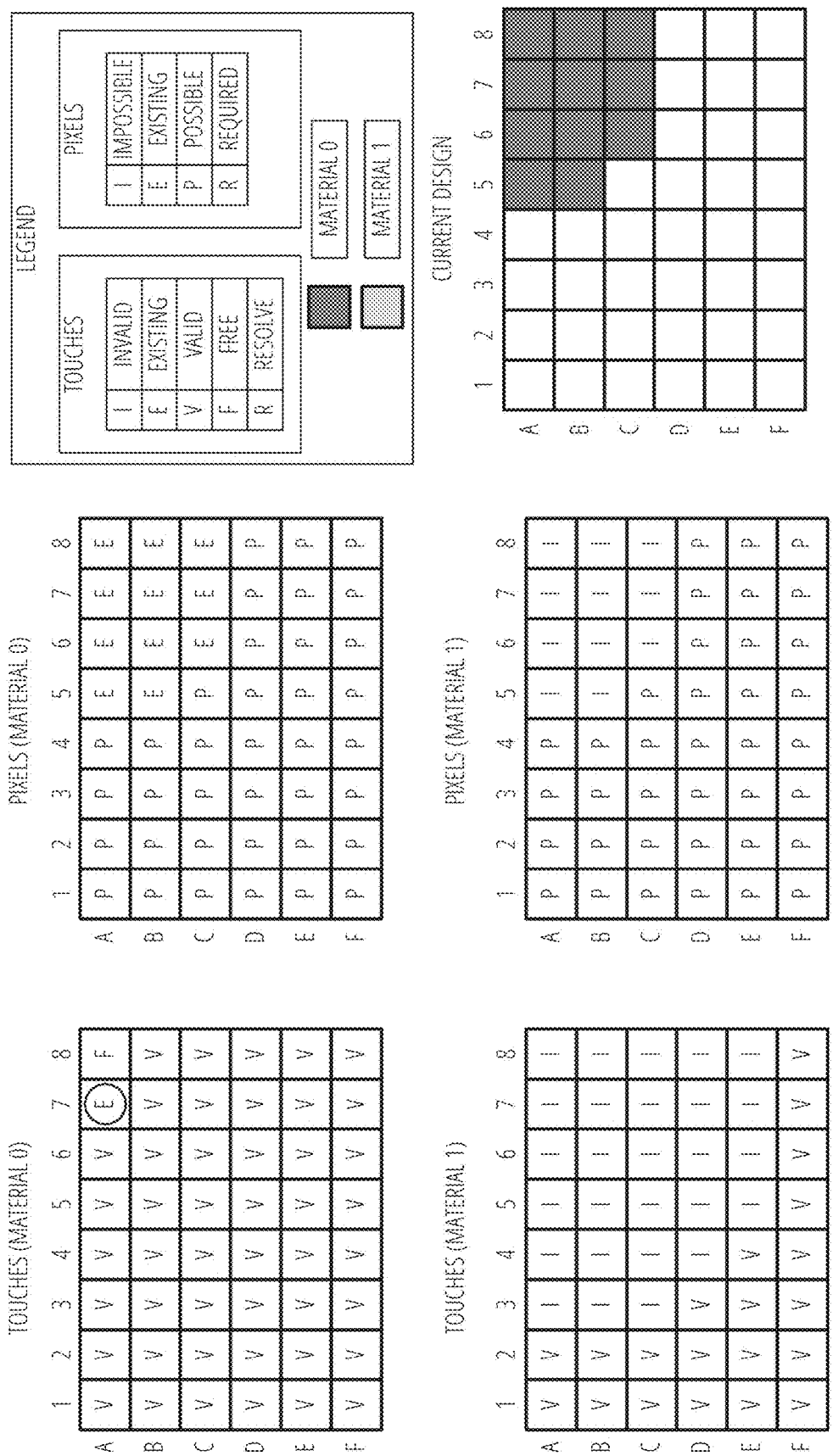

FIG. 10B illustrates a non-limiting example embodiment of the actions from block 802 to block 822 if, after the state illustrated in FIG. 10A, the segment selection engine 406 chose segment A7 to be touched with the first material (indicated by the circle in the set of touch statuses for the first material).

At block 722, the touch maintenance engine 408 updated segment A7 in the set of touch statuses for the first material to the existing status, and the procedure 800 was called after the method 700 looped back to terminal A. A touch with the paintbrush pattern for the first material at A7 causes segments A5-A8, B5-B8, and C6-C8 to be filled with the first material, and so at block 802, those segments in the set of material statuses for the first material were updated to the existing status. Since those segments are now the first material, they cannot be the second material, and so at block 804, the material maintenance engine 410 updated those same segments in the set of material statuses for the second material to the impossible status.

After the touch at segment A7, segments A5-A8, B5-B8, and C6-C8 have been updated to the existing status in the set of material statuses for the first material and to the impossible status in the set of material statuses for the second material. At decision block 806, it is determined that touches in segments A3-A8, B3-B8, C3-C8, D4-D8, and E5-E8 with the paintbrush pattern for the second material would affect either segments having an existing status for the first material or an impossible status for the second material (which, at this point, are the same segments). Accordingly, segments A3-A8, B3-B8, C3-C8, D4-D8, and E5-E8 have been updated to the invalid status in the set of touch statuses for the second material at block 808.

It was determined at decision block 810 and at decision block 814 that there were no unreachable or required segments, respectively, and so no action was taken with respect to those statuses. It was determined at decision block 820 that a touch at segment A8 would only affect segments of the first material that have an existing status in the set of material statuses for the first material and would not affect any segments having an existing status or a possible status for any other material. Accordingly, the result of decision block 820 was YES and segment A8 in the set of touch statuses for the first material was updated to have a free status at block 822.

FIG. 9 is a flowchart that illustrates a non-limiting example embodiment of a procedure for determining a set of available segments for a touch according to various aspects of the present disclosure. As stated above, a calling method (such as method 700) may call the procedure 900 to determine a set of segments from which a choice will be made regarding which segment should be touched next.

From a start block, the procedure 900 advances to decision block 902, where a determination is made regarding whether there are any segments having a required-resolving status. In some embodiments, the procedure 900 may check all of the sets of touch statuses (e.g., the set of touch statuses for each material) for any segments having the required-resolving status. If it is determined that there are any segments having a required-resolving status, then the determination at decision block 902 is YES, and the procedure 900 proceeds to block 904, where the segment selection engine 406 labels all segments having a required-resolving status to be available for the touch. The procedure 900 then advances to an end block and returns control to its caller.

Returning to decision block 902, if it is determined that there are not any segments having a required-resolving status, then the determination at decision block 902 is NO, and the procedure 900 proceeds to block 906, where the segment selection engine 406 labels all segments having a valid status to be available for the touch. The procedure 900 then advances to an end block and returns control to its caller.

FIG. 10C to FIG. 10L illustrate continued creation of the proposed segmented design in subsequent loops of the method 700, after those discussed above.

Figure 10C:
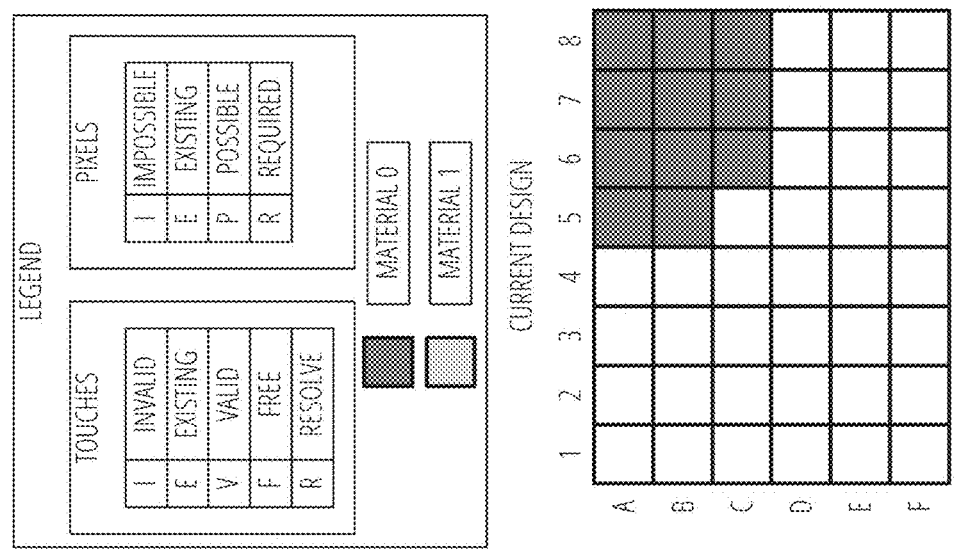

In FIG. 10B, the outcome of procedure block 710 resulted in segment A8 being marked as free. Accordingly, FIG. 10C illustrates the outcome of decision block 712 being YES, and segment A8 being updated to have an existing status at block 714. The method 700 then returns to terminal A. Upon the next loop, the method 700 does not have further segments to update in procedure block 710, and the next action is taken at procedure block 718, where, since there are no segments having the required-resolving status, all of the segments having the valid status are labeled as available.

Figure 10D:
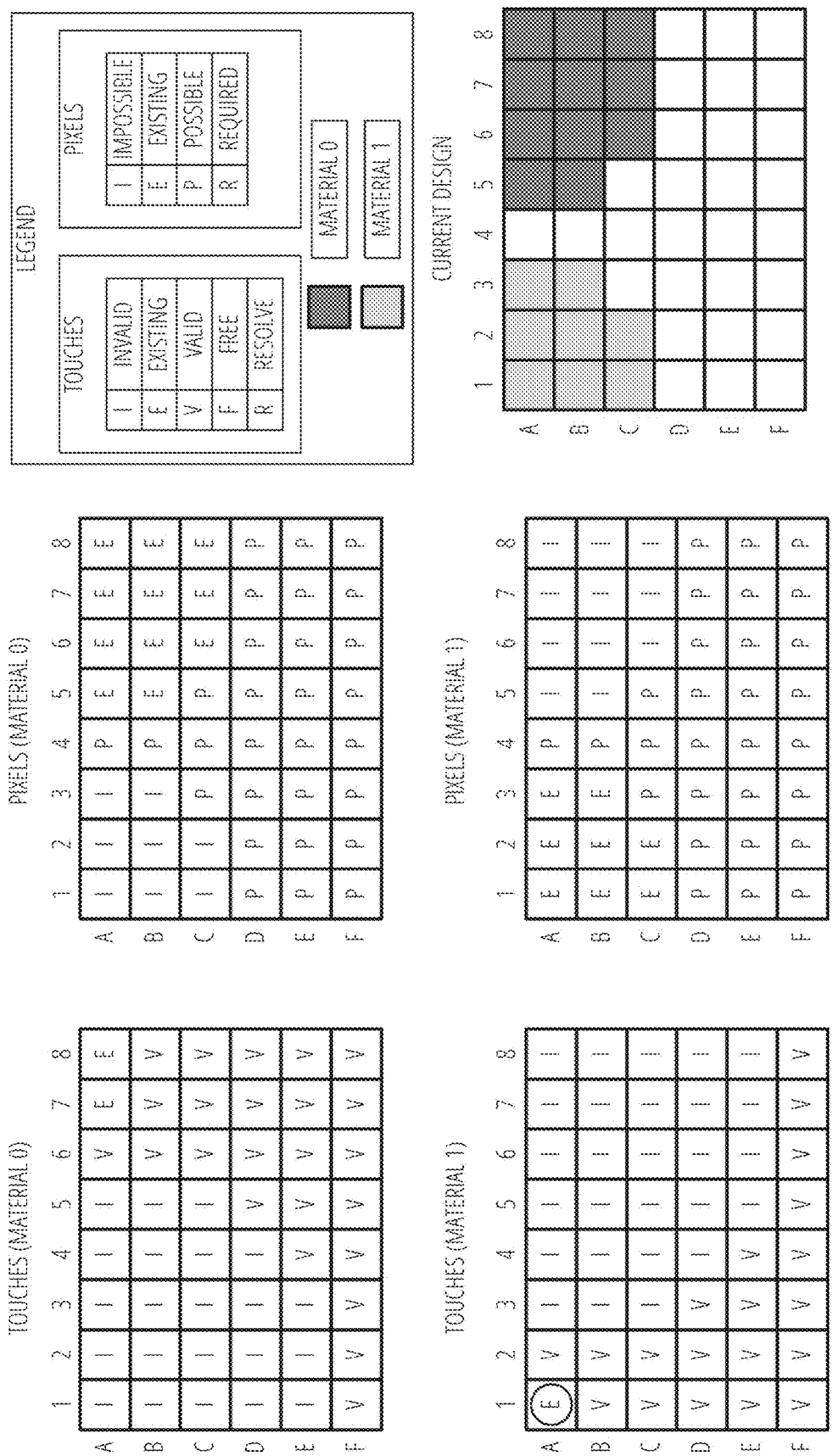

FIG. 10D illustrates the result of the segment selection engine 406 selecting to touch segment A1 with the second material. The remainder of the processing, wherein segment A1 is updated to the existing status for the set of touch statuses for the second material, segments A1-A3, B1-B3, and C1-C2 are updated to the existing status in the set of material statuses for the second material and to the impossible status in the set of material statuses for the first material, and segments A1-A5, B1-B5, C1-C5, D1-D4, and E1-E3 are updated to the invalid status in the set of touch statuses for the first material, similar to the discussion above with respect to FIG. 10A to FIG. 10B. It can be seen that the number of segments having a valid status in the sets of touch statuses is falling dramatically, thus greatly reducing the search space for the next touch in each iteration of the loop.

Figure 10E:
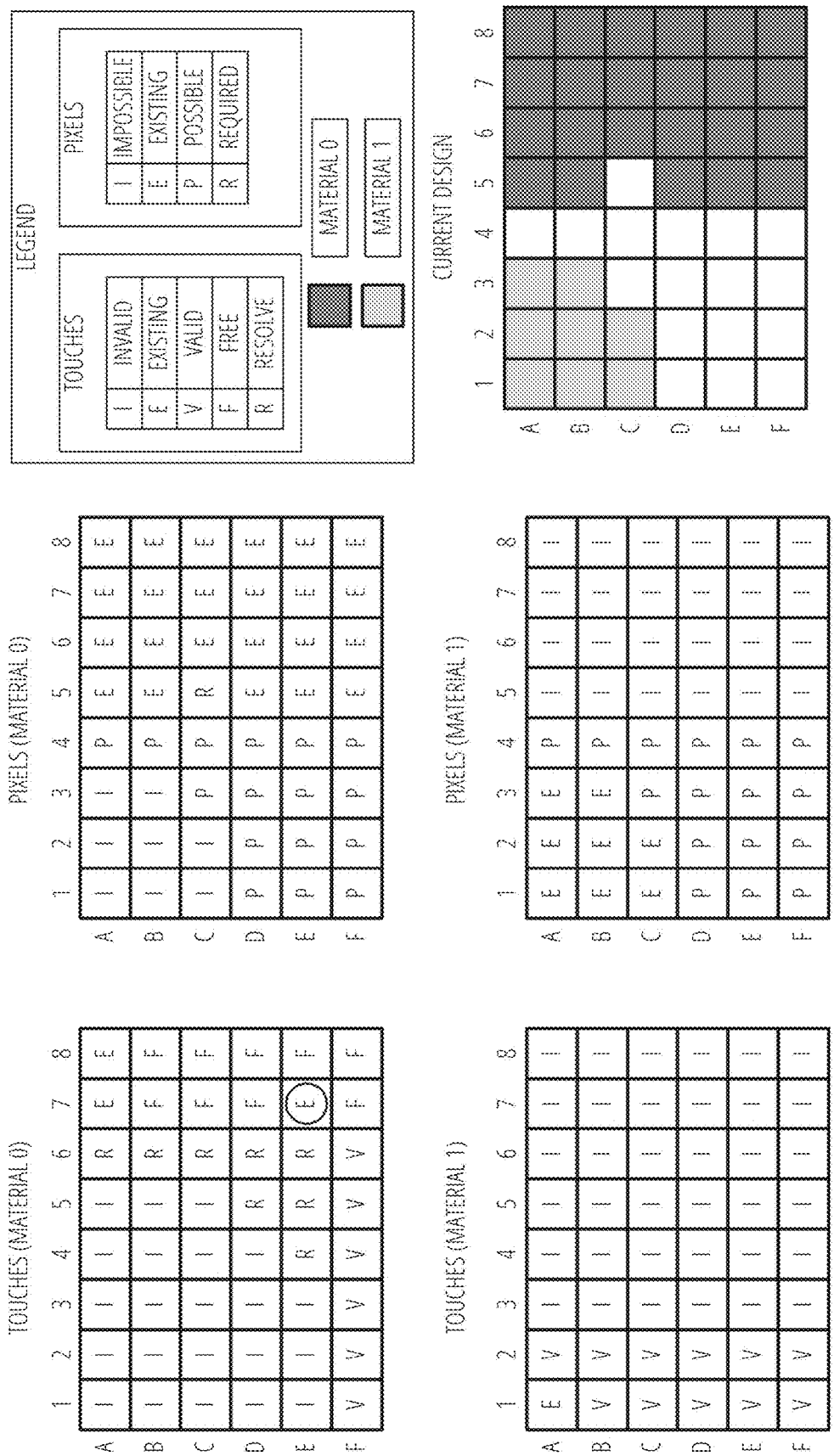

In FIG. 10E, the segment selection engine 406 has selected segment E7 to touch using the first material. Accordingly, segment E7 is updated to the existing status in the set of touch statuses for the first material at block 722. The method 700 then loops back through terminal A, and calls procedure 800 at procedure block 710. Segments D5-D8, E5-E8, and F5-F8 are updated to the existing status in the set of material statuses for the first material at block 802, and segments D5-D8, E5-E8, and F5-F8 are updated to the impossible status in the set of material statuses for the second material at block 804.

Because touches in these segments would reach at least one of the newly impossible status segments of the set of material statuses for the second material at D5-D8, E5-E8, or F5-F8, the segments at D3, E3-E4, and F3-F8 are updated to the invalid status in the set of touch statuses for the second material at block 808.

At this point, segment C5 in the set of material statuses for the second material would still have a possible status. However, at decision block 810, it would be determined that C5 cannot be reached by a touch with the second material in a segment in the set of touch statuses for the second material that does not have an invalid status. Intuitively, it can be seen in the illustration of the current design in FIG. 10E that there is no way that the paintbrush pattern for the second material will be able to reach segment C5. Accordingly, segment C5 is updated to the impossible status in the set of material statuses for the second material at block 812. The determination at decision block 814 would find that segment C5 has the possible status in the set of material statuses for the first material but the impossible status in the set of material statuses for the second material. Accordingly, segment C5 is updated to the required status in the set of material statuses for the first material at block 816, and segments A6, B6, C6, D5-D6, and E4-E6 are updated to the required-resolving status in the set of touch statuses for the first material at block 818.

Segments B7-B8, C7-C8, D7-D8, E8, and F7-F8 are determined to be free for the first material, because they would not affect any segments having an existing status or a possible status for the second material, and would only affect segments that have an existing status or a required status for the first material. Accordingly, these segments are updated to the free status in the set of touch statuses for the first material at block 822.

Figure 10F:
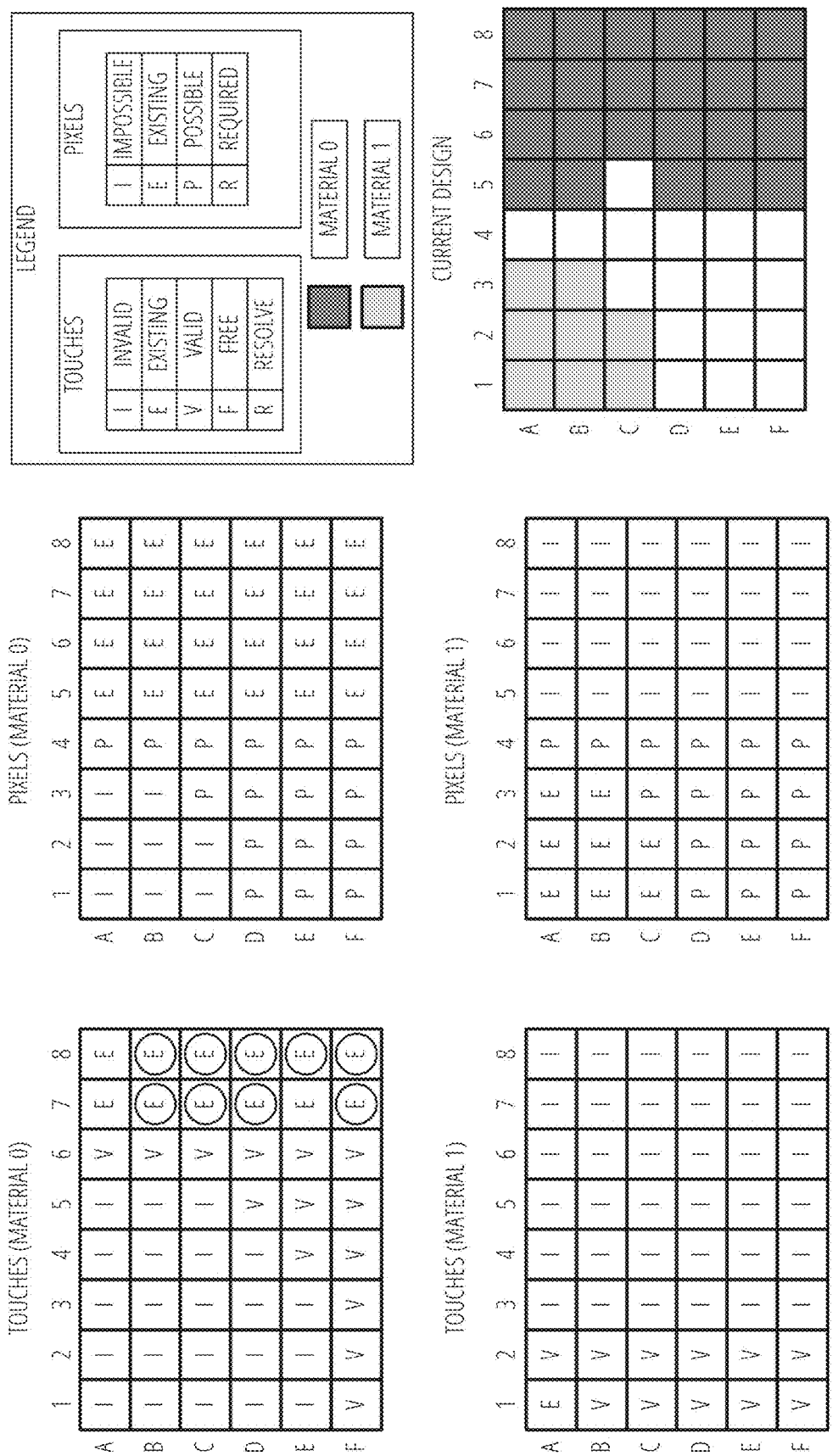

In FIG. 10F, the segments having a free status in the set of touch statuses for the first material are updated to the existing status, per block 714. The method 700 then loops back to terminal A again.

Figure 10G:
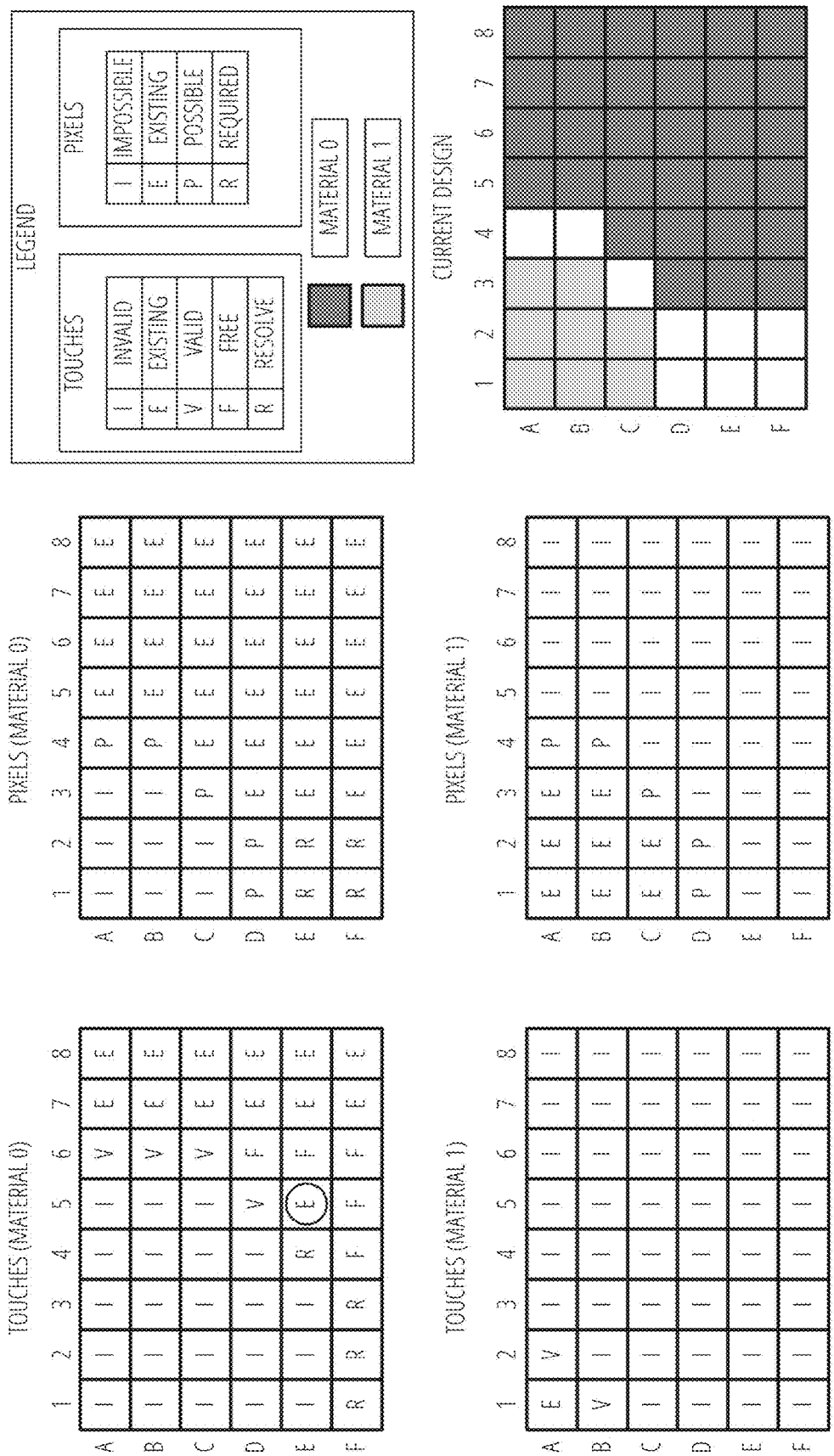

In FIG. 10G, the segment selection engine 406 chose segment E5 at block 720 from the available segments determined in procedure block 718. Segment E5 is updated to have the existing status in the set of touch statuses at block 722, and the method 700 loops back to terminal A. Segments C4, D3-D4, E3-E4, and F3-F4 are updated to the existing status in the set of material statuses for the first material at block 802, and segments C4, D3-D4, E3-E4, and F3-F4 are updated to the impossible status in the set of material statuses for the second material at block 804.

At decision block 806, it is determined that segments B2, C1-C2, D1-D2, E1-E2, and F1-F2 are invalid for the second material, and so these segments are updated to the invalid status in the set of touch statuses for the second material at block 808. Thereafter, it is determined that segments E1-E2 and F1-F2 are unreachable by the paintbrush pattern for the second material, and so segments E1-E2 and F1-F2 are updated to the impossible status in the set of material statuses for the second material at decision block 810. At decision block 814, segments E1-E2 and F1-F2 are determined to be required for the first material, and so segments E1-E2 and F1-F2 are updated to the required status in the set of material statuses for the first material at block 816. At block 818, segments E4 and F1-F3 are updated to the required-resolving status in the set of touch statuses for the first material. Segments D6, E6, and F4-F6 are determined to be free, and are updated in the set of touch statuses for the first material to the free status at block 822.

Figure 10H:
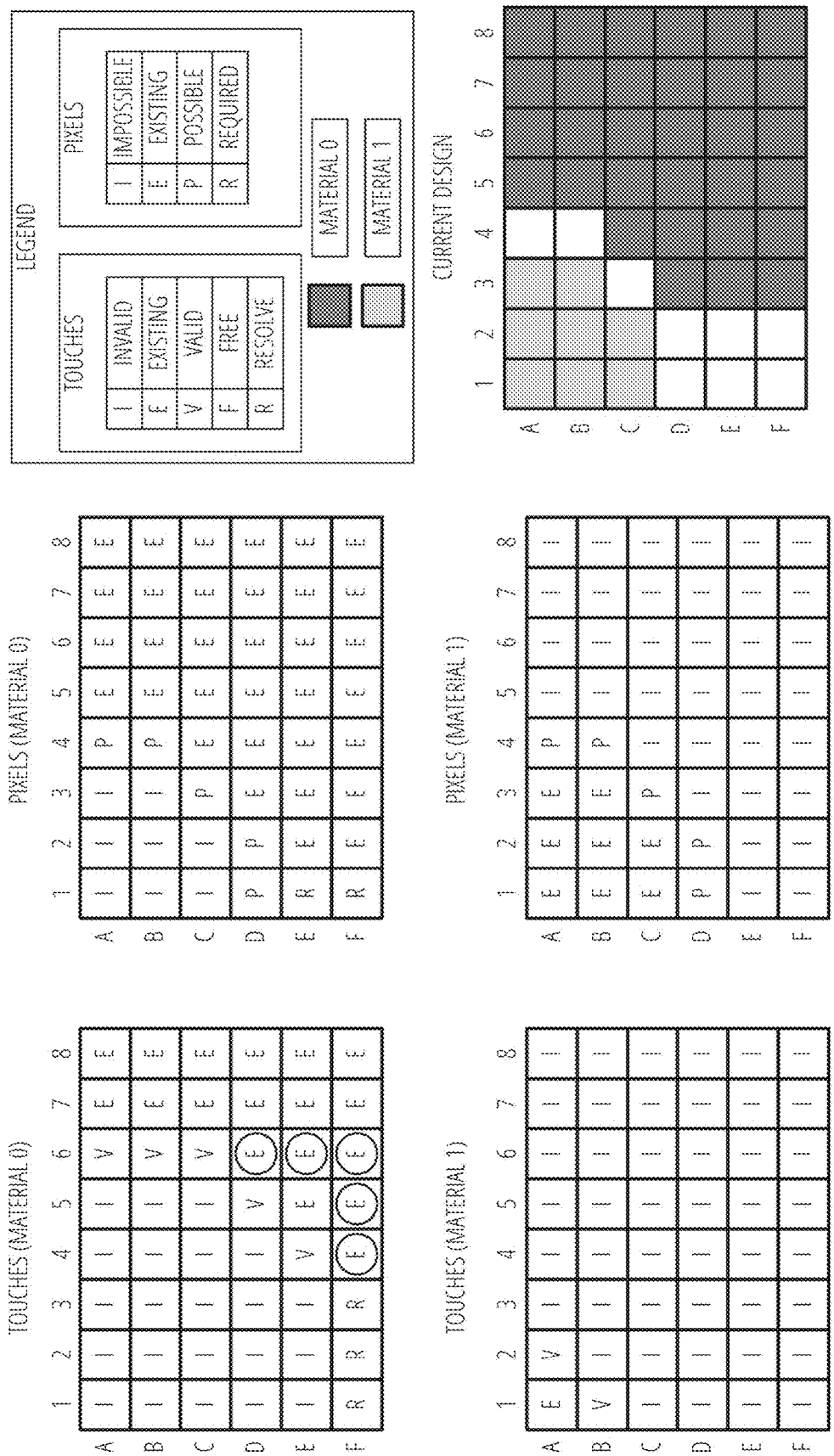

In FIG. 10H, segments D6, E6, and F4-F6 are updated from the free status to the existing status in the set of touch statuses for the first material, per block 714. The method 700 then loops back to terminal A.

Figure 10I:
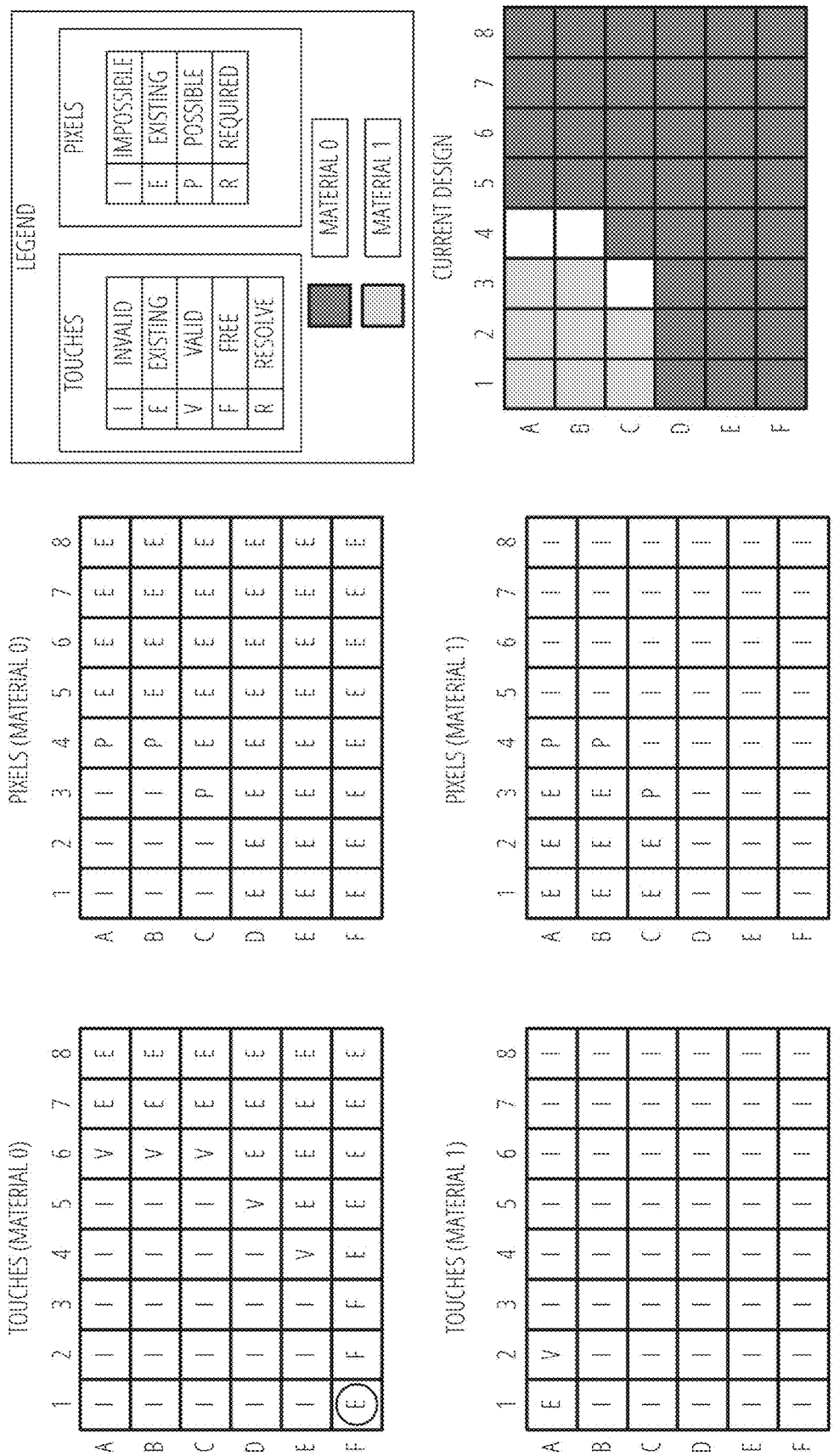

In FIG. 10I, the segment selection engine 406 chooses segment F1 to be touched at block 720 from the segments having the required-resolving status that were labeled as available in procedure 900. The status of segment F1 is updated to the existing status in the set of touch statuses for the first material at block 722. The status of segments D1-D2, E1, and F1 are updated to the existing status in the set of material statuses for the first material at block 802. The status of segments D1-D2 are updated to the impossible status in the set of material statuses for the second material at block 804. Segment B1 is updated to the invalid status in the set of touch statuses for the second material at block 808. Segments F2-F3 are updated to the free status in the set of touch statuses for the first material at block 822.

Figure 10J:
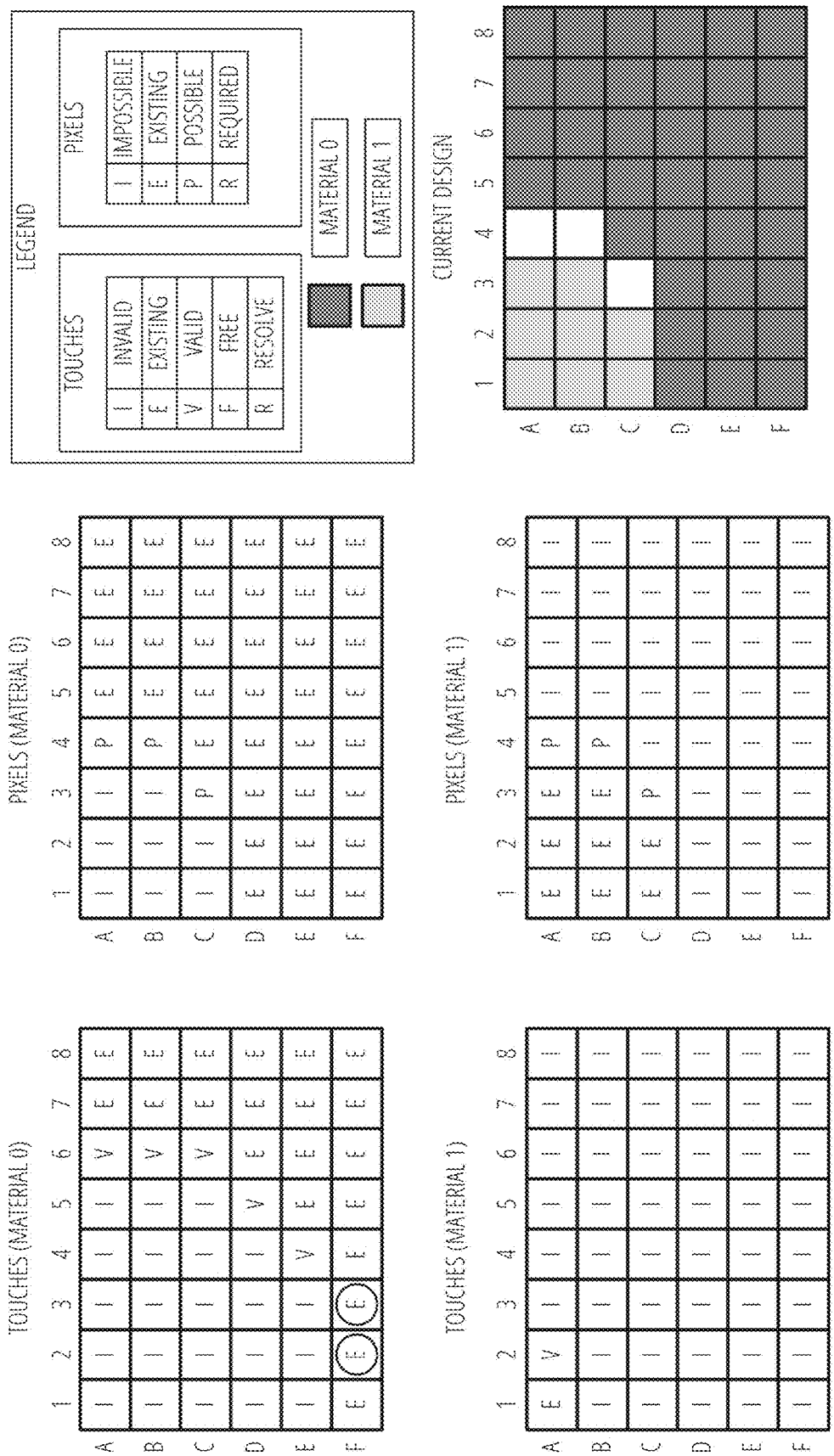

In FIG. 10J, segments F2-F3 are updated to the existing status in the set of touch statuses for the first material at block 714. The method 700 then returns again to terminal A.

Figure 10K:
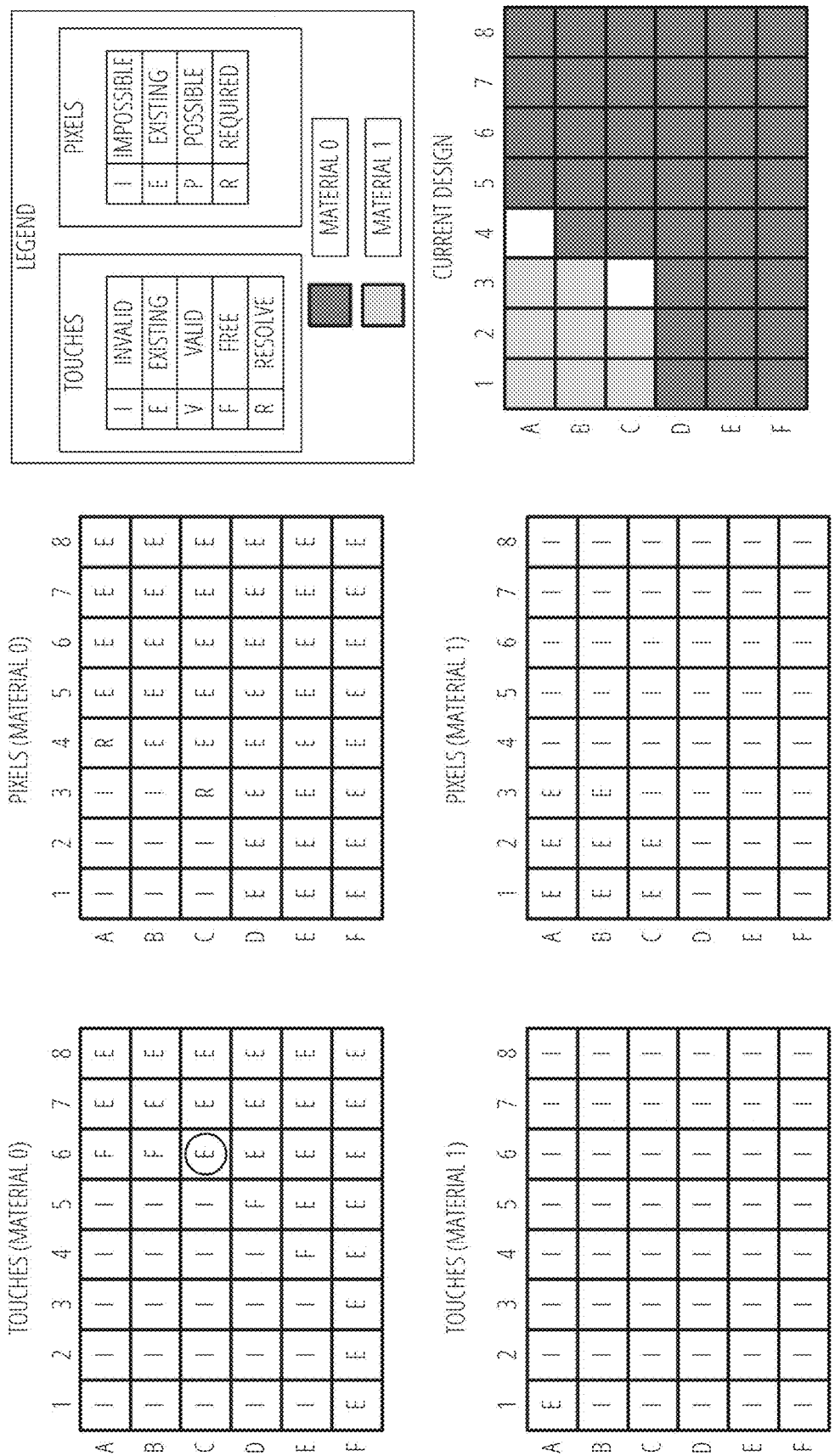

In FIG. 10K, the segment selection engine 406 chooses segment C6 to be touched at block 720 from the segments having the valid status that were labeled as available in procedure 900. Segment C6 is updated to the existing status in the set of touch statuses for the first material at block 722. Segment B4 is updated to the existing status in the set of material statuses for the first material at block 802, and segments A4, B4, and C3 are updated to the impossible status in the set of material statuses for the second material at block 804. Segment A2 is updated to the invalid status in the set of touch statuses for the second material at block 808, since it would reach segment B4 (which now has the existing status for the first material). Segments C3 and A4 are now unreachable by the second material, and so their status is updated to the impossible status in the set of material statuses for the second material at block 812. Now that segments C3 and A4 have the possible status in the set of material statuses for the first material and have the impossible status in the set of material statuses for the second material, segments C3 and A4 are updated to the required status in the set of material statuses for the first material at block 816. Segments E4, D5, B6, and A6 are updated to the free status in the set of touch statuses for the first material at block 822, because touching them would not affect any segments having an existing status or a possible status for another material, and would only affect segments that have an existing status or a required status for the first material.

Figure 10L:
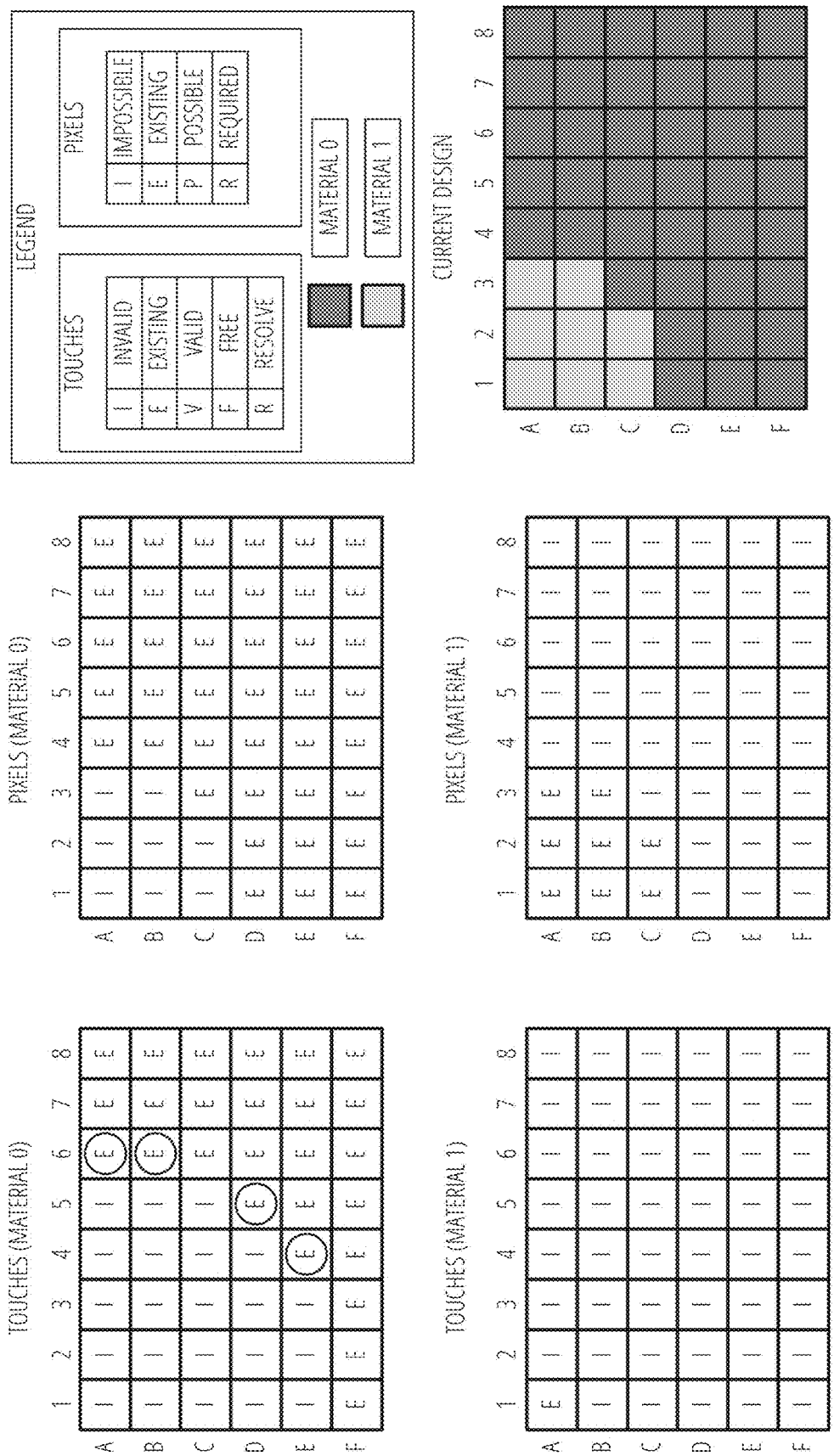

In FIG. 10L, segments A6, B6, D5, and E4 are updated to the existing status in the set of touch statuses for the first material at block 714. The method 700 then returns again to terminal A. At this point, once the method 700 reaches decision block 716, no further segments having the valid status remain. Accordingly, the result of decision block 716 will be NO, and the method 700 will advance to block 724 to generate the proposed segmented design.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, cause the computing system to perform actions for creating a fabricable segmented design for a physical device, the actions comprising:
   receiving, by the computing system, a design specification to be used to create a proposed segmented design, wherein each segment of the proposed segmented design indicates a material within the segment, and wherein the proposed segmented design includes segments that indicate at least two different materials;
   choosing, by the computing system, a segment to touch with a paintbrush pattern for a first material;
   updating, by the computing system, a set of material statuses for each material based on the chosen segment;
   updating, by the computing system, a set of touch statuses for each material based on the chosen segment;
   repeating the choosing and updating actions until all segments are associated with a material; and
   generating, by the computing system, the proposed segmented design based on the sets of material statuses.

2. The non-transitory computer-readable medium of claim 1, wherein the actions further comprise transmitting, by the computing system, the proposed segmented design to a fabrication system to fabricate the physical device.

3. The non-transitory computer-readable medium of claim 1, wherein the actions further comprise:
   initializing each segment in each set of material statuses to a possible status; and
   initializing each segment in each set of touch statuses to a valid status.

4. The non-transitory computer-readable medium of claim 3, wherein choosing the segment to touch with the paintbrush pattern for the first material includes:
   choosing a segment from the set of touch statuses having the valid status based on a cost of selecting the segment.

5. The non-transitory computer-readable medium of claim 1, wherein updating the set of material statuses for each material based on the chosen segment includes:

updating the chosen segment in a set of material statuses for the first material to an existing status;

updating each segment covered by the paintbrush pattern in the set of material statuses for the first material to the existing status; and updating segments in each set of material statuses for materials other than the first material to an impossible status for the segments in the set of material statuses for the first material that were updated to the existing status.

6. The non-transitory computer-readable medium of claim 5, wherein updating the set of touch statuses for each material based on the chosen segment includes:

determining a set of segments in the set of touch statuses for each other material wherein touching the segment with a paintbrush pattern for the other material would reach a segment in the set of material statuses for the other material having the impossible status or a segment in any other set of material statuses having the existing status.

7. The non-transitory computer-readable medium of claim 1, wherein updating the set of touch statuses for each material based on the chosen segment includes:

determining a set of segments in the set of touch statuses for the first material wherein the paintbrush pattern would cover only segments of an existing status or a required status in the set of material statuses for the first material and would not cover any segments having an existing status or a possible status in sets of material statuses for other materials; and updating the segments of the set of segments in the set of touch statuses for the first material to a free status.

8. The non-transitory computer-readable medium of claim 7, wherein the actions further comprise updating the segments in the set of touch statuses for the first material having the free status to the existing status.

9. The non-transitory computer-readable medium of claim 1, wherein the actions further comprise:

determining a set of segments in the set of material statuses for the first material wherein a status of the segment in all of the other sets of material statuses is the impossible status; and updating the segments of the set of segments in the set of material statuses for the first material to a required status.

10. The non-transitory computer-readable medium of claim 9, wherein updating the set of touch statuses for each material based on the chosen segment includes:

determining a set of segments in the set of touch statuses for the first material wherein the status of the segment in the set of touch statuses is a valid status and wherein the paintbrush pattern would cover a segment of a required status in the set of material statuses for the first material; and updating the segments of the set of segments in the set of touch statuses to a required-resolving status.

11. The non-transitory computer-readable medium of claim 10, wherein choosing the segment of the proposed segmented design to touch with the paintbrush pattern for the first material includes:

in response to determining that the set of touch statuses includes at least one segment having the required-resolving status, choosing a segment having the required-resolving status to touch.

12. A computer-implemented method for ensuring fabricability of a proposed segmented design of a physical device, the method comprising:

receiving, by a computing system, a design specification to be used to create a proposed segmented design, wherein each segment of the proposed segmented design indicates a material within the segment, and wherein the proposed segmented design includes segments that indicate at least two different materials;

choosing, by the computing system, a segment to touch with a paintbrush pattern for a first material;

updating, by the computing system, a set of material statuses for each material based on the chosen segment;

updating, by the computing system, a set of touch statuses for each material based on the chosen segment;

repeating the choosing and updating actions until all segments are associated with a material; and generating, by the computing system, the proposed segmented design based on the sets of material statuses.

13. The method of claim 12, further comprising transmitting, by the computing system, the proposed segmented design to a fabrication system to fabricate the physical device.

14. The method of claim 12, further comprising:

initializing each segment in each set of material statuses to a possible status; and initializing each segment in each set of touch statuses to a valid status.

15. The method of claim 14, wherein choosing the segment of the proposed segmented design to touch with the paintbrush pattern for the first material includes:

choosing a segment from the set of touch statuses having the valid status based on a cost of selecting the segment.

16. The method of claim 12, wherein updating the set of material statuses for each material based on the chosen segment includes:

updating the chosen segment in a set of material statuses for the first material to an existing status;

updating each segment covered by the paintbrush pattern in the set of material statuses for the first material to the existing status; and updating segments in each set of material statuses for materials other than the first material to an impossible status for the segments in the set of material statuses for the first material that were updated to the existing status.

17. The method of claim 16, wherein updating the set of touch statuses for each material based on the chosen segment includes:

determining a set of segments in the set of touch statuses for each other material wherein touching the segment with a paintbrush pattern for the other material would reach a segment in the set of material statuses for the other material having the impossible status or a segment in any other set of material statuses having the existing status.

18. The method of claim 12, wherein updating the set of touch statuses for each material based on the chosen segment includes:

determining a set of segments in the set of touch statuses for the first material wherein the paintbrush pattern would cover only segments of an existing status or a required status in the set of material statuses for the first material and would not cover any segments having an existing status or a possible status in sets of material statuses for other materials;

updating the segments of the set of segments in the set of touch statuses for the first material to a free status; and updating the segments of the set of segments in the set of touch statuses for the first material from the free status to the existing status.

19. The method of claim 12, further comprising:

determining a set of segments in the set of material statuses for the first material wherein the status of the segment in all of the other sets of material statuses is the impossible status;

updating the segments of the set of segments in the set of material statuses for the first material to a required status;

determining a set of segments in the set of touch statuses for the first material wherein the status of the segment in the set of touch statuses for the first material is a valid status and wherein the paintbrush pattern would cover a segment of a required status in the set of material statuses for the first material; and updating the segments of the set of segments in the set of touch statuses for the first material to a required-resolving status.

20. The method of claim 19, wherein choosing the segment to touch with the paintbrush pattern for the first material includes:

in response to determining that the set of touch statuses for the first material includes at least one segment having the required-resolving status, choosing a segment having the required-resolving status to touch.

\* \* \* \* \*